(12) United States Patent
Yoneoka et al.

(10) Patent No.: US 8,514,947 B2
(45) Date of Patent: Aug. 20, 2013

(54) SEMICONDUCTOR DEVICE AND SIGNAL PROCESSING METHOD

(75) Inventors: Noboru Yoneoka, Kawasaki (JP); Hirofumi Nagaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1273 days.

(21) Appl. No.: 12/343,745

(22) Filed: Dec. 24, 2008

(65) Prior Publication Data

US 2009/0172506 A1 Jul. 2, 2009

(30) Foreign Application Priority Data

Dec. 26, 2007 (JP) ................................. 2007-334910

(51) Int. Cl.
*G06F 11/07* (2006.01)
(52) U.S. Cl.
USPC ...................................... 375/240.26; 708/402
(58) Field of Classification Search
USPC ................. 708/402; 375/340, 240.1–240.29, 375/240.26; 382/250; 348/25–172, 699–702, 348/818–843; 709/247
See application file for complete search history.

(56) References Cited

U.S. PATENT DOCUMENTS

| 5,343,501 | A | * | 8/1994 | Kadono et al. | ................. | 375/340 |
| 5,479,364 | A | * | 12/1995 | Jones et al. | ..................... | 708/402 |
| 6,217,234 | B1 | * | 4/2001 | Dewar et al. | ................... | 709/247 |
| 2005/0038843 | A1 | * | 2/2005 | LaRocca et al. | .............. | 708/402 |

FOREIGN PATENT DOCUMENTS

JP 2006-60314 3/2006

OTHER PUBLICATIONS

California Technical Publishing: The Discrete Cosine Transform (Dct) Tutorial, 2007, p. 1.*
Journal of Semiconductor Technology and Science: A High Throughput Multiple Transform Architecture for H.264/AVC Fidelity Range Extensions, Dec. 2007, vol. 7., No. 4, p. 250.*
Springer Science and Business Media, LLC: Effective algorithms for fast transcoding of AVS to H.264/AVC in the spatial domain, 2007.*
Mircosoft Corporation, viLOGIC, Inc.: vc1 Decoder Inverse Transform module, 2004; http://codecs.multimedia.cx/wp-content/vc1itrans.c; pp. 1-8.*

* cited by examiner

*Primary Examiner* — Mehrdad Dastouri
*Assistant Examiner* — Mohammed Rahaman
(74) *Attorney, Agent, or Firm* — Staas & Halsey LLP

(57) ABSTRACT

A semiconductor device including a first processing unit processing an input signal based on a plurality of image compression standards, a signal generation unit outputting a switching signal to the first processing unit, a first calculation unit performing an operation on the input signal in accordance with a first coefficient that is based on the switching signal, a second calculation unit performing an operation on an output of the first calculation unit in accordance with a second coefficient that is based on the switching signal, a selection unit selecting one of the output of the first calculation unit and an output of the second calculation unit based on the switching signal, and a third calculation unit selecting one or both of the input signal and the output of the first calculation unit based on the switching signal and performing a predetermined calculation on the selected signal.

18 Claims, 16 Drawing Sheets

*1: -f[7]x1.5
*2: -f[7]x1.5+f[5]
*3: -f[7]x1.5+f[5]+f[3]

SEMICONDUCTOR DEVICE AND SIGNAL PROCESSING METHOD

CROSS-REFERENCE TO RELATED APPLICATIONS

This application claims the benefit of priority of Japanese Patent Application No. 2007-334910 filed on Dec. 26, 2007, the entire contents of which are incorporated herein by reference.

BACKGROUND

1. Field

The present application relates to a semiconductor device and a signal processing method.

2. Description of the Related Art

A multi-media decoder is known as one of devices that process signals based on a plurality of image compression standards. A typical multi-media decoder is equipped with a plurality of decoding function units and an interface supporting connection configurations between the plurality of decoding function units.

Since a typical technique discussed in Japanese Laid-open Patent Publication No. 2006-60314 requires decoding function units with respect to each of image compression standards, this technique requires a large circuit scale. Moreover, an increase in number of decodable image compression standards results in an increase in the resultant circuit scale.

SUMMARY

Various embodiments of the present invention provide a semiconductor device that includes a first processing unit processing an input signal based on a plurality of image compression standards, a signal generation unit outputting a switching signal, which sets a calculation based on the plurality of image compression standards, to the first processing unit, a first calculation unit performing an operation on the input signal in accordance with a first coefficient that is based on the switching signal, a second calculation unit performing an operation on an output of the first calculation unit in accordance with a second coefficient that is based on the switching signal, a selection unit selecting one of the output of the first calculation unit and an output of the second calculation unit based on the switching signal, and a third calculation unit selecting one or both of the input signal and the output of the first calculation unit based on the switching signal and performing a predetermined calculation on the selected signal based on the switching signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Hereinafter, a detailed description of an embodiment of a semiconductor device and a signal processing method will be disclosed with reference to attached drawings.

Figure 1:
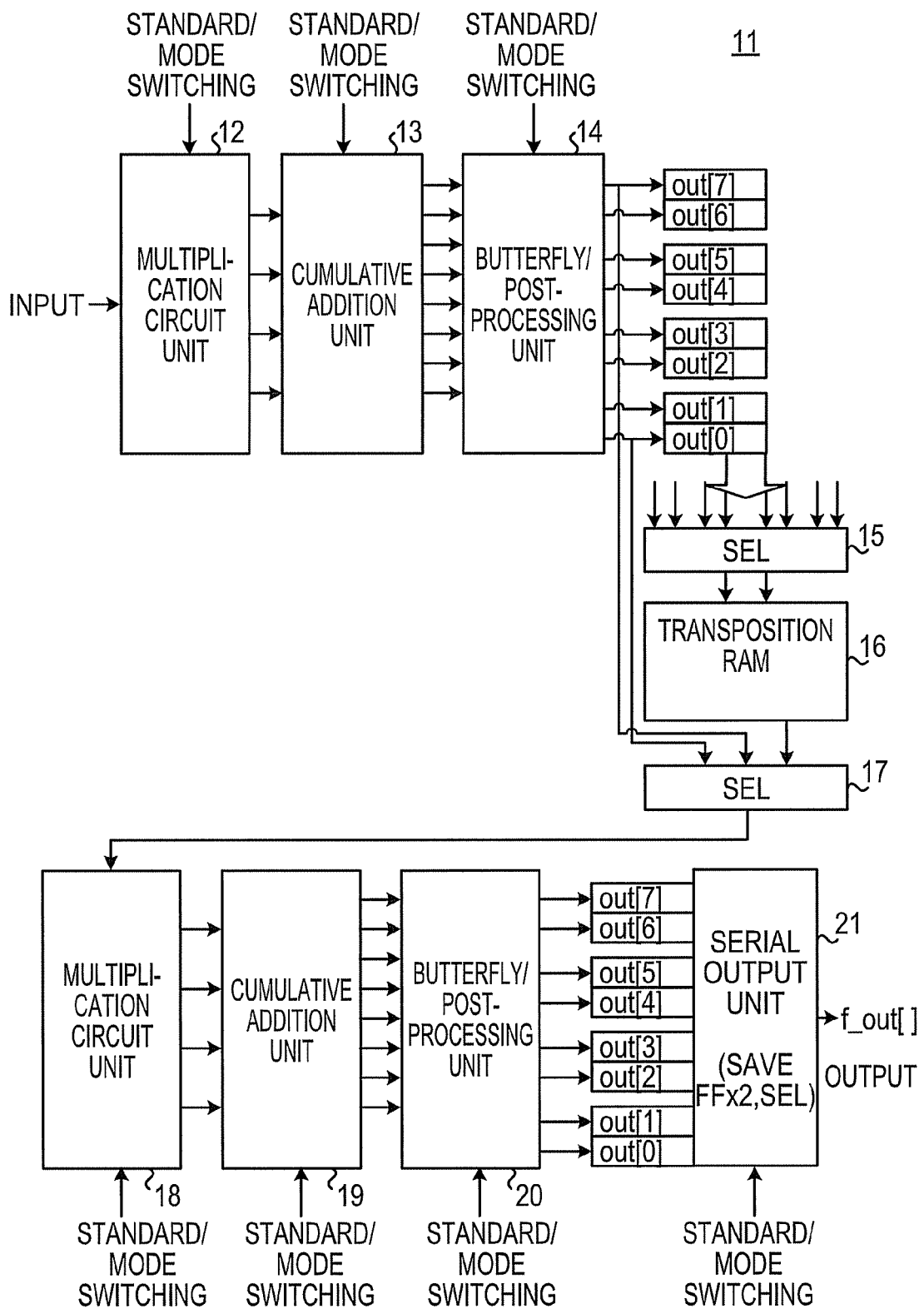
FIG. 1 illustrates an inverse transform unit of an embodiment.

FIG. 1 illustrates an inverse transform unit of the embodiment.

As shown in FIG. 1, an inverse transform unit 11 includes a first multiplication circuit unit 12, a first cumulative addition unit 13, a first butterfly/post-processing unit 14, a first selector (SEL) 15, a transposition RAM 16, a second selector 17, a second multiplication circuit unit 18, a second cumulative addition unit 19, a second butterfly/post-processing unit 20, and a serial output unit 21. With respect to input signals encoded with reference to respective moving picture encoding standards, one-dimensional horizontal calculations are carried out by the first multiplication circuit unit 12, the first cumulative addition unit 13, and the first butterfly/post-processing unit 14. Output signals from the first butterfly/post-processing unit 14 are supplied to the second multiplication circuit unit 18 via the first selector 15, the transposition RAM 16, and the second selector 17. The transposition RAM 16 rearranges the output signals from the first butterfly/post-processing unit 14. Then one-dimensional vertical calculations are carried out by the second multiplication circuit unit 18, the second cumulative addition unit 19, and the second butterfly/post-processing unit 20.

As further shown in FIG. 1, outputs out[0] to out[7] from the second butterfly/post-processing unit 20 are outputted, as an f_out□, from the serial output unit 21. Each of the outputs f_out□ may be outputted once in every cycle. Note that any one of counting numbers from 0 to 7 may be, for example, set between a pair of brackets "□" of the f_out□. As further shown in FIG. 1, the first multiplication circuit unit 12, the first cumulative addition unit 13, the first butterfly/post-processing unit 14, the second multiplication circuit unit 18, the second cumulative addition unit 19, the second butterfly/post-processing unit 20, and the serial output unit 21 carry out processes, each of which corresponds to standard/mode switching signals, respectively. Hereinafter, details of these structural members will be disclosed in sequence. Note that since respective blocks in FIG. 1 include a plurality of calculating units and circuit blocks each having the same name, hereinafter, ordinal numbers, such as, "the m-n" are attached to the calculating units and the circuit blocks having the same name, so that the calculating units and the circuit blocks having the same name may be distinguished with each other.

Figure 2:
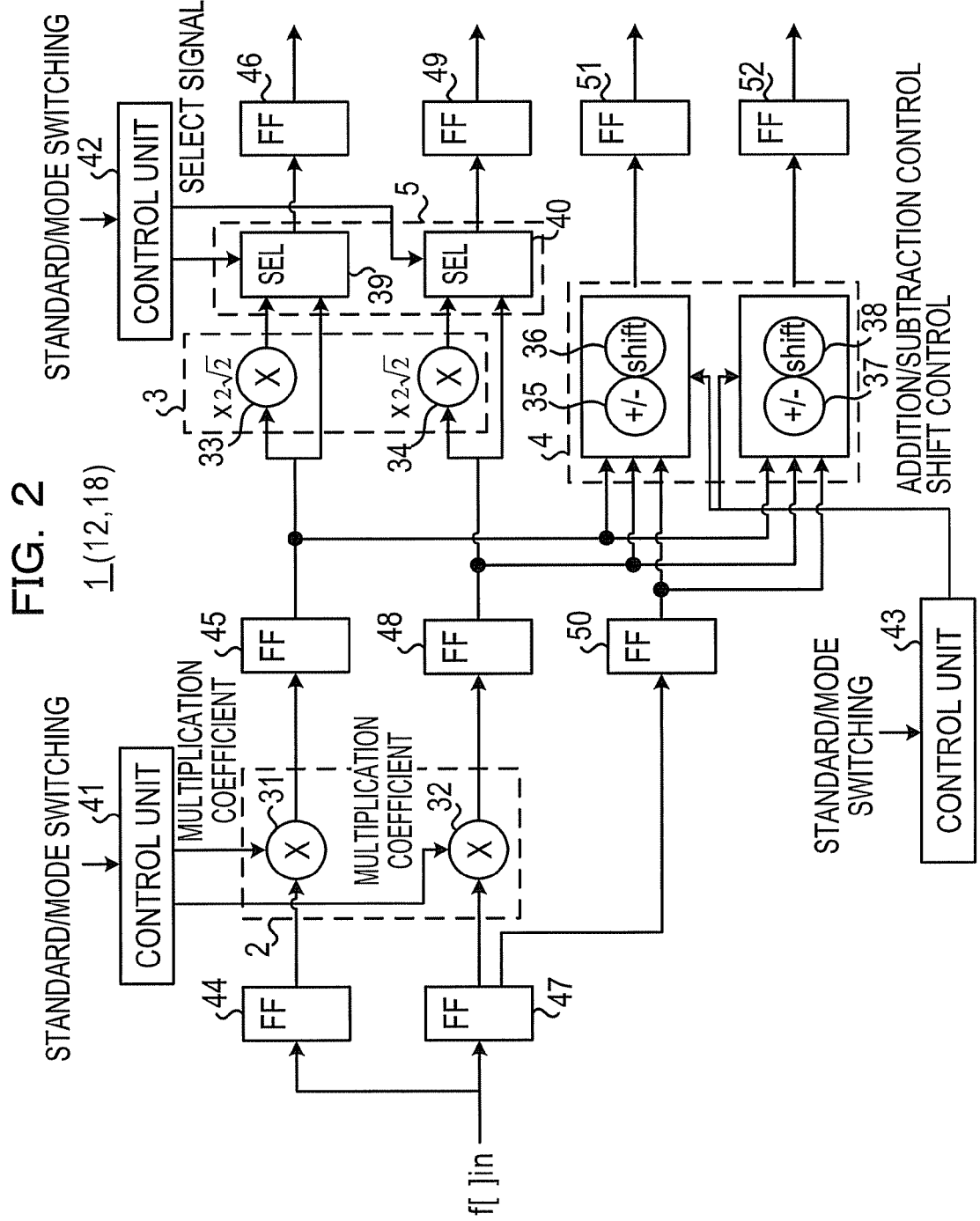
FIG. 2 illustrates a multiplication circuit unit in FIG. 1.

As further shown in FIG. 2, the first multiplication circuit unit 12 and the second multiplication circuit unit 18 may have, for example, the same structure and may be made up of a first processing unit 1.

Hereinafter, an inverse transform process will be disclosed.

In recent years, a variety of moving picture encoding standards, such as, not only an MPEG2 standard but also a VC-1 standard, an AVS standard, and an H.264 standard, has been used for television sets, streaming contents on the Internet, storage media or the like. In consequence, apparatuses reproducing moving pictures, which are encoded in conformity with the variety of moving picture encoding standards, are required to process the plurality of moving picture encoding standards. With regard to each of the moving picture encoding standards, fundamental algorithms, used in each inverse transform process, resembles each other, and on the other hand, coefficient values, calculation methods, and error detection methods thereof are different with each other. In regard to inputs and outputs, the inverse transform processes according to the respective standards may be represented with matrix operations and coefficient values expressed by Equation (1) shown below.

$$(P[0]\,P[1]\,P[2]\,P[3]\,P[4]\,P[5]\,P[6]\,P[7]) =$$

$$(f[0]\,f[1]\,f[2]\,f[3]\,f[4]\,f[5]\,f[6]\,f[7])$$

$$\begin{bmatrix} A & A & A & A & A & A & A & A \\ B & D & F & H & -H & -F & -D & -B \\ C & G & -G & -C & -C & -G & G & C \\ D & -H & -B & -F & F & B & H & -D \\ E & -E & -E & E & E & -E & -E & E \\ F & -B & H & D & -D & -H & B & -F \\ G & -C & C & -G & -G & C & -C & G \\ H & -F & D & -B & B & -D & F & -H \end{bmatrix}$$

Note that a P[n] matrix and an f[n] matrix are a matrix that indicates a result of a one-dimensional inverse transform process and a matrix that indicates one-dimensional input coefficient data, respectively. A to H are coefficients transform matrix. Values of the coefficients A to H with respect to each standard will be represented in Table 1.

TABLE 1

(The value in case of MPEG1, 2, and 4 is further multiplied by $\sqrt{2}/2$)

| | MPEG1, 2, 4 iDCT | VC-1 8 * 8 | VC-1 4 * 4 | AVS | H.264 8 * 8 | H.264 4 * 4 |
|---|---|---|---|---|---|---|
| A | cos(π/4) | 12 | 17 | 8 | 1 | 1 |
| B | cos(π/16) | 16 | — | 10 | 1.5 | — |
| C | cos(π/8) | 16 | 22 | 10 | 1 | 1 |
| D | cos(3π/16) | 15 | — | 9 | 1.25 | — |
| E | cos(π/4) | 12 | 17 | 8 | 1 | 1 |
| F | sin(3π/16) | 9 | — | 6 | 0.75 | — |
| G | sin(π/8) | 6 | 10 | 4 | 0.5 | 0.5 |
| H | sin(π/16) | 4 | — | 2 | 0.375 | — |

With regard to the H.264 standard, a method of an intermediate calculation is clearly specified. That is to say, a process, in which addition/subtractions and shift processes are used, is defined in the H.264 standard. Moreover, detection of whether or not a result of the intermediate calculation exceeds a predetermined range is defined. For the above reasons, the process according to the H.264 standard is different from the matrix operations according to the other standards. With regard to the H.264 standard, since the order of operations is equal to a determinant represented by Equation (1) in an inverse transform process where a block size is 4 pixels by 4 pixels in a longitudinal direction and in a lateral direction (hereinafter, referred to as a "4×4 inverse transform process"), there is no disadvantage.

However, since the matrix operations and the order of the operations are different from the determinant represented by Equation (1) in an inverse transform process where a block size is 8 pixels by 8 pixels in the longitudinal direction and in the lateral direction (hereinafter, referred to as an "8*8 inverse transform process"), the matrix operation represented by Equation (1) is not performed. Consequently, in order to process the H.264 standard and the other moving picture encoding standards by using the same inverse transform processing circuit, for example, a structure, which is compatible with two types of processes, that is to say, the inverse transform process based upon the determinant represented by Equation (1) and the inverse transform process based upon the addition/subtractions and the shift processes in accordance with the H.264 standard, may be employed. It is preferable that the inverse transform processing circuit, which is compatible with the two types of processes, have a reduced circuit scale in comparison with the cases in which dedicated inverse transform processing circuits are provided with respect to each of the moving picture encoding standards.

Generally, a two-dimensional inverse transform process is represented by a matrix operation in Equation (2). The matrix operation represented by Equation (2) may be broken down into one-dimensional inverse transforms, that is to say, a horizontal calculation (data'=data×T) and a vertical calculation (X=T'×data'). The one-dimensional inverse transform (data×T) is a matrix operation. By further breaking down the one-dimensional inverse transform (data×T) into a matrix operation of one row in a horizontal direction and one column in a vertical direction, Equation (3) and Equation (4) may be obtained.

$$X = T'^* \text{data} * T \quad (2)$$

$$(P[0]P[1]P[2]P[3]) = (f[0]f[2]f[4]f[6]) \begin{bmatrix} A & A & A & A \\ C & G & -G & -C \\ E & -E & E & -E \\ G & -C & C & -G \end{bmatrix} + \quad (3)$$

$$(f[1]f[3]f[5]f[7]) \begin{bmatrix} B & D & F & H \\ D & -H & -B & -F \\ F & -B & H & D \\ H & -F & D & -B \end{bmatrix} \Lambda$$

$$(P[7]P[6]P[5]P[4]) = (f[0]f[2]f[4]f[6]) \begin{bmatrix} A & A & A & A \\ C & G & -G & -C \\ E & -E & E & -E \\ G & -C & C & -G \end{bmatrix} - \quad (4)$$

$$(f[1]f[3]f[5]f[7]) \begin{bmatrix} B & D & F & H \\ D & -H & -B & -F \\ F & -B & H & D \\ H & -F & D & -B \end{bmatrix} \Lambda$$

A matrix T[n] and a matrix R[n] may be formed as represented by Equation (5) and Equation (6), respectively, shown below. The matrix T[n] and the matrix R[n] are a matrix of the intermediate calculation.

$$(f[0]f[2]f[4]f[6]) \begin{bmatrix} A & A & A & A \\ C & G & -G & -C \\ E & -E & E & -E \\ G & -C & C & -G \end{bmatrix} = (T[0]T[1]T[2]T[3])\Lambda \quad (5)$$

$$(f[1]f[3]f[5]f[7]) \begin{bmatrix} B & D & F & H \\ D & -H & -B & -F \\ F & -B & H & D \\ H & -F & D & -B \end{bmatrix} = (R[0]R[1]R[2]R[3])\Lambda \quad (6)$$

Equation (7) shown below may be obtained from Equations (5) and (6) and Equations (3) and (4).

$$P[0]=T[0]+R[0]$$

$$P[1]=T[1]+R[1]$$

$$P[2]=T[2]+R[2]$$

$$P[3]=T[3]+R[3]$$

$$P[7]=T[0]-R[0]$$

$$P[6]=T[1]-R[1]$$

$$P[5]=T[2]-R[2]$$

$$P[4]=T[3]-R[3] \quad (7)$$

Moreover, by developing Equation (5) and Equation (6), Equation (8) shown below may be obtained.

$$T[0]=A*f[0]+E*f[4]+C*f[2]+G*f[6]$$

$$T[1]=A*f[0]-E*f[4]+G*f[2]-C*f[6]$$

$$T[3]=A*f[0]+E*f[4]-(C*f[2]+G*f[6])$$

$$T[2]=A*f[0]-E*f[4]-(G*f[2]-C*f[6])$$

$$R[0]=B*f[1]+D*f[3]+F*f[5]+H*f[7]$$

$$R[1]=D*f[1]-H*f[3]-B*f[5]-F*f[7]$$

$$R[2]=F*f[1]-B*f[3]+H*f[5]+D*f[7]$$

$$R[3]=H*f[1]-F*f[3]+D*f[5]-B*f[7] \quad (8)$$

Equation (8) represents a case where the 8×8 inverse transform process is performed, and Equation (9) shown below represents a case where the 4×4 inverse transform process is performed. Note that multiplication coefficients A, B, C, and D in Equation (9) correspond to A, C, E, and G in Table 1, respectively.

$$T[0]=A*f[0]+C*f[2]$$

$$T[1]=A*f[0]-C*f[2]$$

$$R[0]=B*f[1]+D*f[3]$$

$$R[1]=D*f[1]-B*f[3] \quad (9)$$

FIG. 2 illustrates the multiplication circuit unit in FIG. 1.

As shown in FIG. 2, the first processing unit 1 processes an input signal f[ ] in depending on a plurality of image compression standards, based on the plurality of image compression standards. Here, for example, any one of counting numbers from 0 to 7 may be set between a pair of brackets "☐" of the ☐. To the first processing unit 1, the standard/mode switching signal is supplied from a signal generation unit (not shown). The first processing unit 1 includes a first calculating unit 2, a second calculating unit 3, a third calculating unit 4 and a selection unit 5.

As further shown in FIG. 2, a first coefficient of the first calculating unit 2 is set based on the standard/mode-switching signal. The first calculating unit 2 performs a multiplication on the input signal f[ ] in, based upon the first coefficient. The second calculating unit 3 performs a multiplication on an output from the first calculating unit 2, based upon a second coefficient. Although the second coefficient is a fixed value, here, the second coefficient may be set based on the standard/mode-switching signal. The selection unit 5 selects any one of an output from the first calculating unit 2 and an output from the second calculating unit 3, based on the standard/mode-switching signal. The third calculating unit 4 selects one of or both of an output of the input signal and an output from the first calculating unit 2 based on the standard/mode switching signal and performs one of or both of addition/subtractions and shift processes on the selected signal based on the standard/mode switching signal. Output signals MUL0 and MUL1 are obtained from the selection unit 5. Output signals MUL2 and MUL3 are obtained from the third calculating unit 4.

As further shown in FIG. 2, the first processing unit 1, may be, for example, integrated on a Large Scale Integration (LSI) that forms an image processing device, as a part of a function block, which performs a decoding process of encoded image signals. Hereinafter, the first processing unit 1 will be disclosed. Here, the first processing unit 1 may be, for example, provided in a moving picture decoding device, which is used for a television set, a tuner, and a set-top box, or used for a moving picture recording apparatus and a moving picture recording/reproduction apparatus, such as, a high-definition DVD (HD-DVD), a blue-ray player or the like. In the above configuration disclosed above, the first processing unit 1 may be a part of a function block that executes an inverse discrete cosine transform (iDCT) process when an MPEG1 standard, the MPEG2 standard or an MPEG4 standard is performed, and on the other hand, the first processing unit 1 executes an inverse integer transform process when the other standards, such as, the VC-1 standard, the AVS standard or the H.264 standard is performed. Moreover, the function block may be, for example, the inverse transform unit ( ) in FIG. 1.

As further shown in FIG. 2, the first processing unit 1 may include, for example, two variable coefficient multipliers 31 and 32, as the first calculating unit 2, two fixed coefficient multipliers 33 and 34, as the second calculating unit 3, two sets of addition/subtraction-shifter units that may include, for example, adder/subtractors 35 and 37, and bit shifters 36 and 38, as the third calculating unit 4, and two selectors 39 and 40, as the selection unit 5. The variable coefficient multiplier is a multiplier in which any values may be set as the multiplication coefficient. The fixed coefficient multiplier is a multiplier in which a fixed value is set as the multiplication coefficient.

As further shown in FIG. 2, the first processing unit includes a first-first control unit 41 setting multiplication coefficients of the variable coefficient multipliers 31 and 32 based on the standard/mode switching signal, a first-second control unit 42 controlling selection operations by the selectors 39 and 40 based on the standard/mode switching signal, and a first-third control unit 43 controlling addition/subtractions and bit shifts performed by the two sets of addition/subtraction-shifter units based on the standard/mode switching signal. These control units 41, 42, and 43 may be the same or different with each other. Moreover, the first processing unit 1 may include, for example, 9 flip-flops (FF) 44 to 52.

As further shown in FIG. 2, the first-first flip-flop 44 latches the input signal f[ ]in. The first-first variable coefficient multiplier 31 performs a multiplication of an output signal from the first-first flip-flop 44 and a multiplication coefficient supplied from the first-first control unit 41. The multiplication coefficient supplied here represents the coefficients A to H multiplied by f[1] to f[7] in Equation (8). The first-second flip-flop 45 latches an output signal from the first-first variable coefficient multiplier 31. The first-first fixed coefficient multiplier 33 performs a multiplication of an output signal from the first-second flip-flop 45 and a fixed multiplication coefficient (for example, $2\sqrt{2}$). The first-first selector 39 selects an output signal outputted from the first-first fixed coefficient multiplier 33 or the output signal outputted from the first-second flip-flop 45 based upon a select signal supplied from the first-second control unit 42. The first-third flip-flop 46 latches an output signal from the first-first selector 39. The output signal MUL0 is outputted from the first-third flip-flop 46.

As further shown in FIG. 2, the first-fourth flip-flop 47 latches the input signal f[ ]in. The first-second variable coefficient multiplier 32 performs a multiplication of an output signal from the first-fourth flip-flop 47 and the multiplication coefficient supplied from the first-first control unit 41. The first-fifth flip-flop 48 latches an output signal from the first-second variable coefficient multiplier unit 32. The first-second fixed coefficient multiplier 34 performs a multiplication of an output signal from the first-fifth flip-flop 48 and the fixed multiplication coefficient (here, it may be, for example, $2\sqrt{2}$). The first-second selector 40 selects an output signal outputted from the first-second fixed coefficient multiplier 34 or the output signal outputted from the first-fifth flip-flop 48, based upon the select signal supplied from the first-second control unit 42. The first-sixth flip-flop 49 latches an output signal from the first-second selector 40. The output signal MUL1 is outputted from the first-sixth flip-flop 49.

As further shown in FIG. 2, a first-seventh flip-flop 50 latches the output signal from the first-fourth flip-flop 47. Based upon an instruction of addition/subtraction control and shift control supplied from the first-third control unit 43, a first-first addition/subtraction-shifter unit that includes a first-first adder/subtractor 35 and a first-first bit shifter 36 performs addition/subtractions or bit shifts or performs a process, in which the addition/subtractions and the bit shifts are combined, on the output signal from the first-second flip-flop 45, the output signal from the first-fifth flip-flop 48, and an output signal from the first-seventh flip-flop 50. The first-eighth flip-flop 51 latches an output signal from the first-first addition/subtraction-shifter unit. The output signal MUL2 is outputted from the first-eighth flip-flop 51.

As further shown in FIG. 2, based upon the instruction of addition/subtraction control and shift control supplied from the first-third control unit 43, a first-second addition/subtraction-shifter unit that includes a first-second adder/subtractor 37 and a first-second bit shifter 38, performs the addition/subtractions or the bit shifts or performs the process, in which the addition/subtractions and the bit shifts are combined, on the output signal from the first-second flip-flop 45, the output signal from the first-fifth flip-flop 48, and the output signal from the first-seventh flip-flop 50. The first-ninth flip-flop 52 latches an output signal from the first-second addition/subtraction-shifter unit. The output signal MUL3 is outputted from the first-ninth flip-flop 52.

Figure 3:
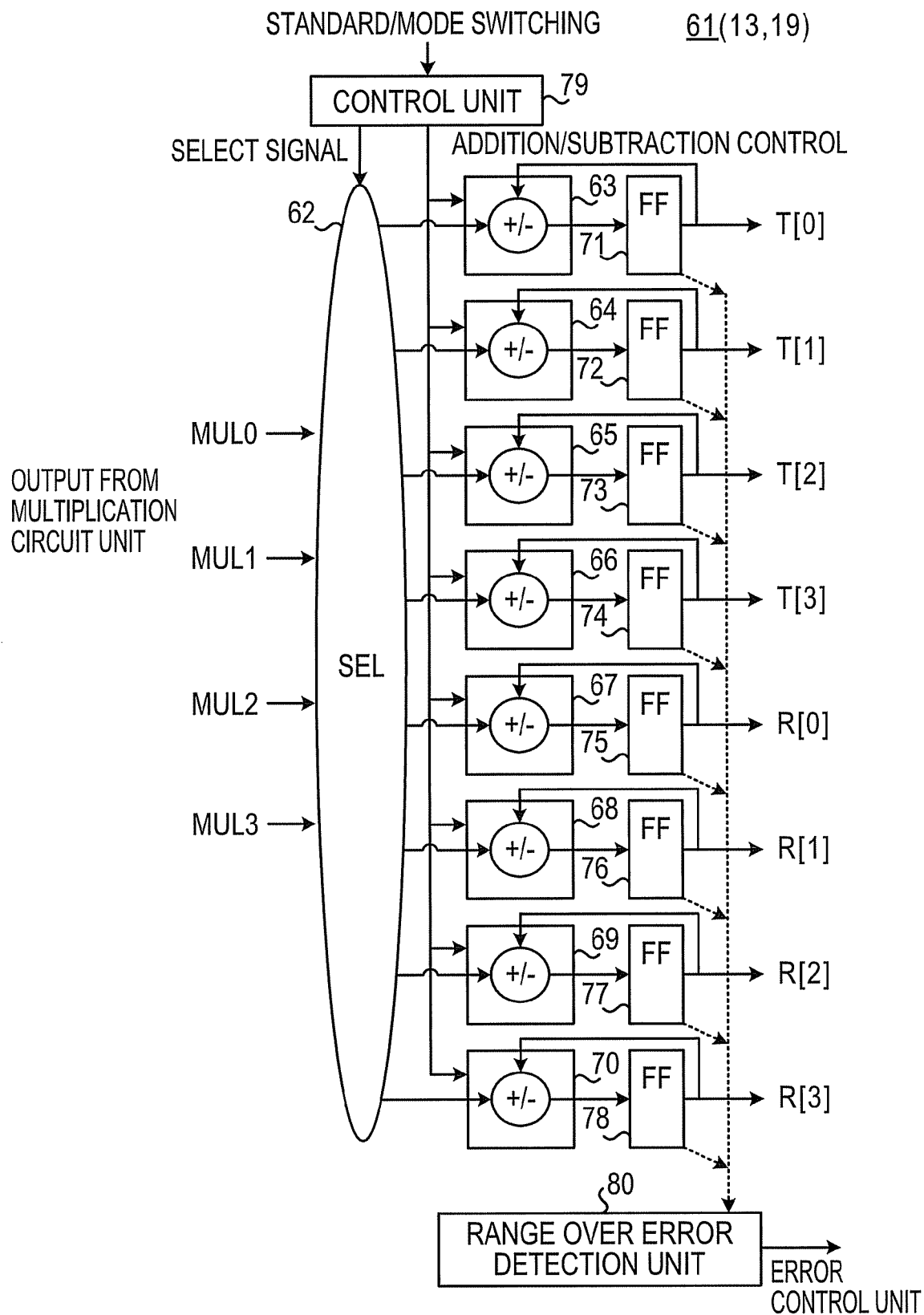
FIG. 3 illustrates a cumulative addition unit in FIG. 1.

FIG. 3 illustrates the cumulative addition unit in FIG. 1. The first cumulative addition unit 13 and the second cumulative addition unit 19 in FIG. 1 may have, for example, the same structure with each other and include a second processing unit 61 shown in FIG. 3.

As shown in FIG. 3, the second processing unit 61 may include, for example, a second-first selector 6, eight second-k adder/subtractors 63 to 70, eight second-k flip-flops 71 to 78, a second-first control unit 79, and a second-first range over error detection unit 80. Here, k may be, for example, counting numbers from 1 to 8. The second-first control unit 79 controls a selection operation by the second-first selector 62, based on the standard/mode switching signal. Moreover, the second-first control unit 79 controls additions/subtractions by the second-k adder/subtractors 63 to 70, based on the standard/mode switching signal.

As further shown in FIG. 3, the second-first selector 62 selects outputs outputted from the first processing unit 1, that is to say, the output signals MUL0, MUL1, MUL2 or MUL3 from the multiplication circuit unit, based upon a select signal supplied from the second-first control unit 79. The second-first adder/subtractor 63 performs a cumulative addition process in which an output signal from the second-first selector 62 is added to or subtracted from an output signal from the second-first adder/subtractor 63, based upon an instruction of addition/subtraction control supplied from the second-first control unit 79. The second-first flip-flop 71 latches the output signal from the second-first adder/subtractor 63 and returns the output signal to the second-first adder/subtractor 63 so as to perform the cumulative addition process. Upon completion of a predetermined cumulative addition process in the second-first adder/subtractor 63, an output signal T[0] is outputted from the second-first flip-flop 71.

As further shown in FIG. 3, the same process carried out with respect to each combination of the adder/subtractor and the flip-flop, such as, the second-second adder/subtractor and the flip-flop, the second-third adder/subtractor and the flip-flop, the second-fourth adder/subtractor and the flip-flop, the second-fifth adder/subtractors and the flip-flops, that is to say, the second-sixth adder/subtractor and the flip-flop, the second-seventh adder/subtractor and the flip-flop, and the second-eighth adder/subtractor and the flip-flop. Based upon these combinations, an output signal T[1], an output signal T[2], and an output signal T[3], an output signal R[0], an output signal R[1], an output signal R[2], and an output signal R[3] are outputted. The second-first range over error detection unit 80 performs a range over error on each of the output signals T[0] to T[3] and R[0] to R[3]. Based on the range over error being detected by the second-first range over error detection unit 80, the second-first range over error detection unit 80 notifies an error control unit (not shown) of the range over error.

FIG. 3 illustrates the cumulative addition unit in FIG. 1. The first butterfly/post-processing unit 14 and the second butterfly/post-processing unit 20 in FIG. 1 may have, for example, the same structure and may, for example, include a third processing unit 91 illustrated in FIG. 4.

Figure 4:
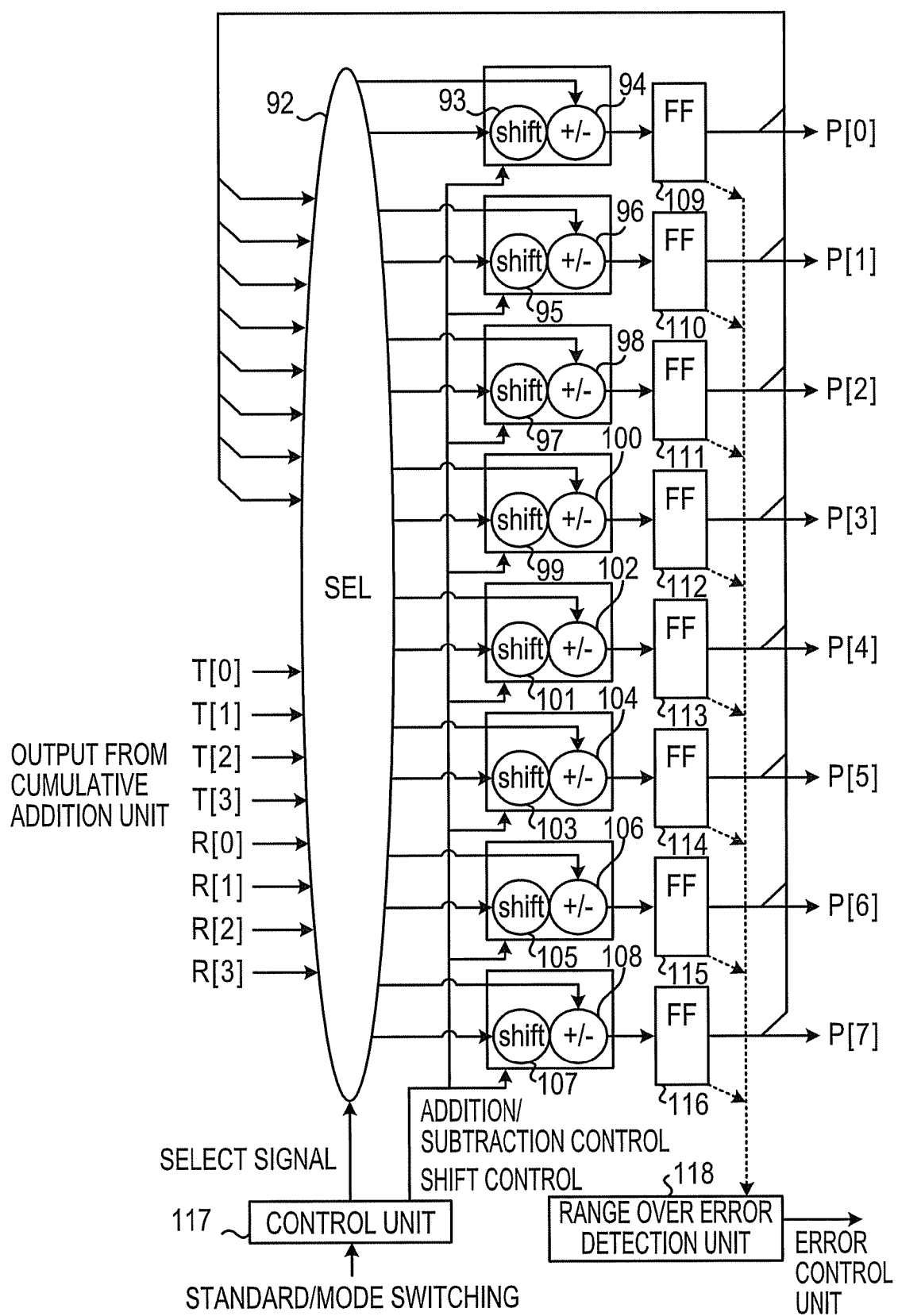
FIG. 4 illustrates a butterfly/post-processing unit in FIG. 1.

As shown in FIG. 4, for example, the third processing unit 91 may include a third-first selector 92, eight sets of third-k shifter-addition/subtraction units that is further provided with third-k bit shifters 93, 95, 97, 99, 101, 103, 105, and 107 and third-k adder/subtractors 94, 96, 98, 100, 102, 104, 106, and 108, eight third-k flip-flops 109 to 116, a third-first control unit 117, and a third-first range over error detection unit 118. Here, k may be, for example, counting numbers from 1 to 8.

As further shown in FIG. 4, the third-first control unit 117 controls a selection operation by the third-first selector 92, based on the standard/mode switching signal. Moreover, the third-first control unit 117 controls bit shifts and addition/subtractions by the third-k shifter-addition/subtraction units, based on the standard/mode switching signal. The third-first selector 92 selects outputs outputted from the second processing unit 61 (that is to say, the output signals T[0] to T[3] and R[0] to R[3] from the cumulative addition unit) and output signals the third processing unit 91, based on the select signal supplied from the third-first control unit 117. In other words, the output signals from the third processing unit 91 may be returned to the third-first selector 92 for a case where the output signals are processed again at the third processing unit 91.

As further shown in FIG. 4, based upon an instruction of shift control and addition/subtraction control supplied from the third-first control unit 117, a third-first shifter-addition/subtraction unit that includes the third-first bit shifter 93 and the third-first adder/subtractor 94 performs addition/subtractions on output signals from the third-first selector 92 or performs a process, in which bit shifts and addition/subtractions are combined. The third-first flip-flop 109 latches an output signal from the third-first shifter-addition/subtraction unit. An output signal P[0] is outputted from the third-first flip-flop 109.

As further shown in FIG. 4, the same process is carried out with respect to each combination of the shifter-addition/subtraction unit and the flip-flop, that it to say, the third-second shifter-addition/subtraction unit and the flip-flop, the third-third shifter-addition/subtraction unit and the flip-flop, the third-fourth shifter-addition/subtraction unit and the flip-flop, the third-fifth shifter-addition/subtraction unit and the flip-flop, the third-sixth shifter-addition/subtraction unit and the flip-flop, the third-seventh shifter-addition/subtraction unit and the flip-flop, and the third-eighth shifter-addition/subtraction unit and the flip-flop. Based upon these combinations, the output signals P[1] to P[7] are outputted. Moreover, the output signals from the third-k flip-flops 109 to 116 may be returned to the third-first selector 92. The third-first range over error detection unit 118 performs a range over error detection on the output signals P[0] to P[7].

As further shown in FIG. 4, with regard to the 8×8 inverse transform process according to the H.264 standard, the intermediate calculation is performed by the third processing unit 91, and as a result thereof, intermediate outputs T[0] to T[3] and R[0] to R[3] obtained from the third processing unit 91. The third-first range over error detection unit 118 performs the range over error detection on the intermediate outputs T[0] to T[3] and R[0] to R[3], as well. Based on the range over error being detected by the second-first range over error detection unit 118, the second-first range over error detection unit 118 notifies an error control unit (not shown) of the range over error.

Figure 5:
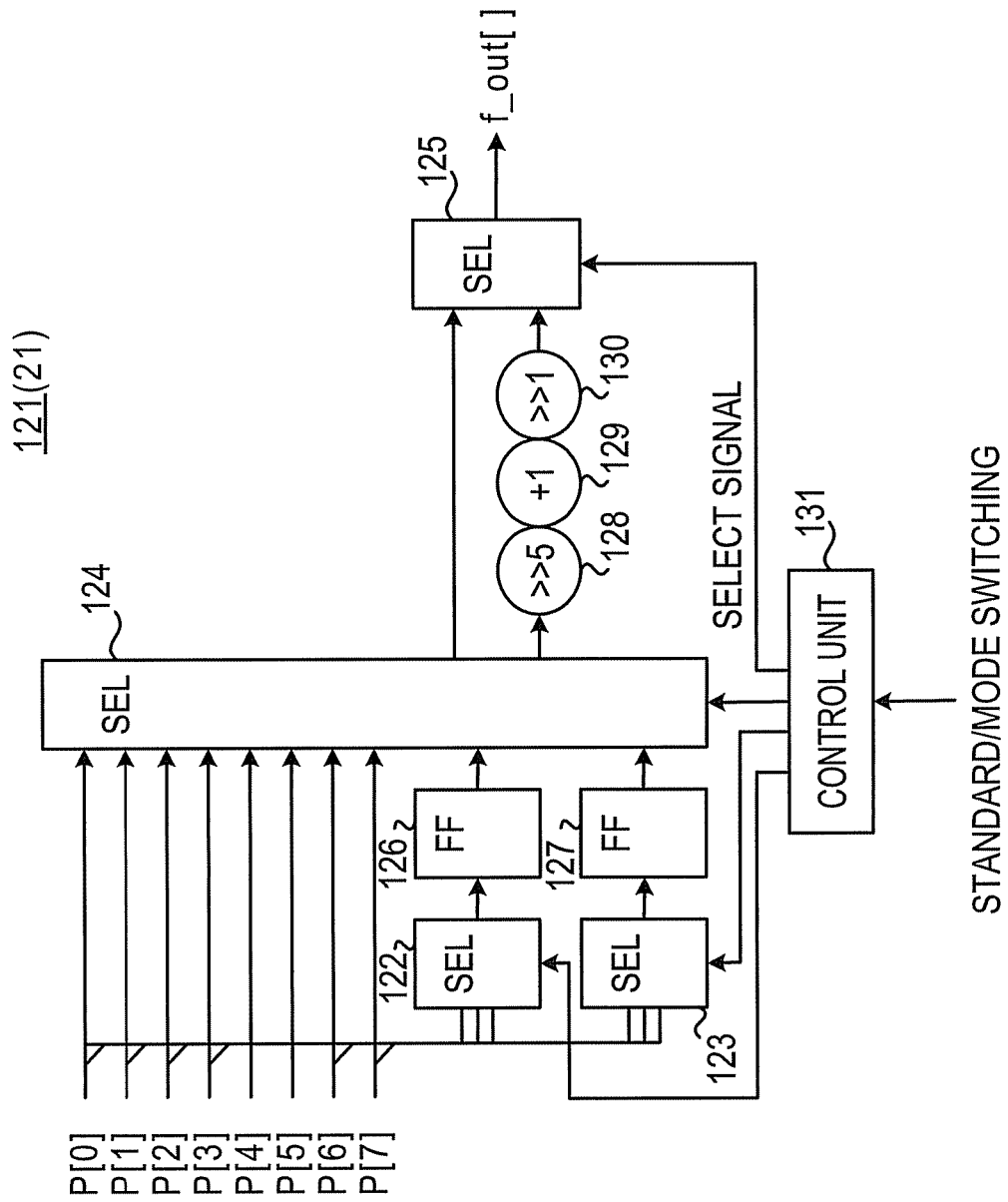
FIG. 5 illustrates a serial output unit in FIG. 1.

FIG. 5 illustrates the serial output unit (21) in FIG. 1. The serial output unit 21 includes a fourth processing unit 121 in FIG. 5.

As shown in FIG. 5, the fourth processing unit 121 may include, for example, four selectors 122 to 125, two flip-flops 126 and 127, a right 5-bit shifter 128 which shifts an input signal by 5 bits in a lower-bit direction, a plus-one adder (+1 adder) 129 which adds 1 to the input signal, a right 1-bit shifter 130 which shifts the input signal by 1 bit in the lower-bit direction, and a fourth-first control unit 131.

As further shown in FIG. 5, the fourth-first control unit 131 controls selection operations by the four selectors 122 to 125, based on the standard/mode switching signal. The fourth-first selector 122 and a fourth-second selector 123 select output signals P[0] to P[3] and output signals P[6] and P[7] from the second butterfly/post-processing unit 20, based upon a select signal supplied from the fourth-first control unit 131. The fourth-first flip-flop 126 latches an output signal from the fourth-first selector 122 and the fourth-second flip-flop 127 latches an output signal from the fourth-second selector 123. The fourth-third selector 124 selects output signals P[0] to P[7] outputted from the second butterfly/post-processing unit 20, an output signal outputted from the fourth-first flip-flop 126, and an output signal outputted from fourth-second flip-flop 127, based upon the select signal supplied from the fourth-first control unit 131.

As further shown in FIG. 5, the right 5-bit shifter 128 shifts an output signal from the fourth-third selector 124 by 5 bits in the lower-bit direction. The +1 adder 129 adds 1 to an output signal from the right 5 bit shifter 128. The right 1 bit shifter 130 shifts an output signal from the +1 adder 129 by 1 bit in the lower-bit direction. The fourth-fourth selector 125 selects an output signal outputted from the fourth-third selector 124 and an output signal outputted from the right 1 bit shifter 130, based on the select signal supplied from the fourth-first control unit 131. The f_out☐ may be outputted from the fourth-fourth selector 125 coefficient by coefficient once in every cycle.

An operation of the inverse transform unit in FIG. 1 relating to the first embodiment when the inverse transform unit is in conformity with the MPEG1 standard, the MPEG2 standard or the MPEG4 standard will be disclosed. The block size, used as a unit of the inverse transform process, is 8 by 8. Roughly speaking, the overall inverse transform process is divided into Operation 1 of performing a calculation represented by Equation (8), Operation 2 of performing a calculation represented by Equation (7), and a round-off process where a round-off calculation to the predetermined (certain) number of bits is performed. The process disclosed above (Or Operations 1 to 3) is carried out twice, that is, as a horizontal inverse transform process and a vertical inverse transform process, before and after an operation performed by the transposition RAM 16. A portion of multiplication (such as, A×f[0]) in Equation (8) in the calculation of Operation 1 is carried out by the multiplication circuit units 12 and 18. A portion of addition or subtraction (such as, A×f[0]+E×f[4]+C×f[2]+G×f[6]) in Equation (8) in the calculation of Operation 1 is carried out by the cumulative addition units 13 and 19. Calculations of Operation 2 are carried out in the butterfly/post-processing units 14 and 20. A calculation process mode goes to a round-off process mode in the end of a horizontal matrix operation in the butterfly/post-processing unit 14 again, and a round-off process represented by Equation (10) shown below is performed on a result of the calculations in Operation 2.

$$P[0]=(P[0]+x)\!\gg\!y$$

$$P[1]=(P[1]+x)\!\gg\!y$$

$$P[2]=(P[2]+x)\!\gg\!y$$

$$P[3]=(P[3]+x)\!\gg\!y$$

$$P[4]=(P[4]+x)\!\gg\!y$$

$$P[5]=(P[5]+x)\!\gg\!y$$

$$P[6]=(P[6]+x)\!\gg\!y$$

$$P[7]=(P[7]+x)\!\gg\!y \qquad (10)$$

Note that ">>" indicates a shift(s) by y bit(s) in the lower bit direction. For example, a calculation in a first row in Equation (10) may indicate that x is added to P[0] and a result thereof is shifted by y bit(s) in the lower bit direction. Note that, here, x and y are integers.

f[0] is multiplied by the coefficient A in the process of Operation 1, in the multiplication circuit units 12 and 18 in FIG. 1. In this calculation, a multiplication coefficient of the first-first variable coefficient multiplier 31 in FIG. 2 is set to A, that is to say, $\cos(\pi/4)$ based upon Table 1, and an input signal f[0]in is multiplied by $\cos(\pi/4)$ by the first-first variable coefficient multiplier 31. Since the coefficient is further multiplied by $2\sqrt{2}$, as shown in Table 1, the first-first selector 39 selects the output signal outputted from the first-first fixed coefficient multiplier 33. Furthermore, f[4] is multiplied by the coefficient E. This calculation is the same as a case where the input signal f[0]in is multiplied by the coefficient A.

f[2] is concurrently multiplied by the coefficient C and the coefficient G. In this calculation, the multiplication coefficient of the first-first variable coefficient multiplier 31 in FIG. 2 is set to C, that is to say, set to $\cos(\pi/8)$ based upon Table 1. Furthermore, an input signal f[2]in is multiplied by the $\cos(\pi/8)$ by the first-first variable coefficient multiplier 31 along therewith. Moreover, the multiplication coefficient of the first-second variable coefficient multiplier 32 in FIG. 1 is set to G, that is to say, set to $\sin(\pi/8)$ based upon Table 1, and an input signal f[2]in is multiplied by $\sin(\pi/8)$ by the first-second variable coefficient multiplier 32. Also in the above case, since the coefficient is further multiplied by $2\sqrt{2}$, the first-first selector 39 and the first-second selector 40 select the output signal outputted from the first-first fixed coefficient multiplier 33 and the output signal outputted from the first-second fixed coefficient multiplier 34, respectively. In addition, f[6] is concurrently multiplied by the coefficient C and the coefficient G. This calculation is the same as a case where the input signal f[2]in is concurrently multiplied by the coefficient C and the coefficient G.

f[1], f[3], f[5], and f[7] are concurrently multiplied by the coefficient B, the coefficient D, the coefficient F, and the coefficient H. The coefficients B, D, F, and H are $\cos(\pi/16)$, $\cos(3\pi/16)$, $\sin(3\pi/16)$, and $\sin(\pi/16)$, based upon Table 1, respectively. Equation (11) and Equation (12) shown below may be obtained by developing $\cos(3\pi/16)$ and $\sin(3\pi/16)$.

$$\begin{aligned}\cos(3\pi/16) &= \cos(4\pi/16 - \pi/16) \\ &= \cos(\pi/4)*\cos(\pi/16)+\sin(\pi/4)*\sin(\pi/16) \\ &= 2\sqrt{2}\,(\cos(\pi/16)+\sin(\pi/16))\end{aligned} \qquad (11)$$

$$\begin{aligned}\sin(3\pi/16) &= \sin(4\pi/16 - \pi/16) \\ &= \sin(\pi/4)*\cos(\pi/16)-\cos(\pi/4)*\sin(\pi/16) \\ &= 2\sqrt{2}\,(\cos(\pi/16)-\sin(\pi/16))\end{aligned} \qquad (12)$$

Equation (13) and Equation (14) shown below may be obtained by expressing Equation (11) and Equation (12) with the coefficients B, D, F, and H.

$$D = 2\sqrt{2}(B+H) \qquad (13)$$

$$F = 2\sqrt{2}(B-H) \qquad (14)$$

As shown in Table 1, since the respective coefficients are further multiplied by $2\sqrt{2}$, the coefficients B, D, F, and H may be represented by Equation (15), Equation (16), Equation (17), and Equation (18) shown below.

$$B = 2\sqrt{2}*B \qquad (15)$$

$$D = (B+H)\!\gg\!1 \qquad (16)$$

$$F = (B-H)\!\gg\!1 \qquad (17)$$

$$H = 2\sqrt{2}*H \qquad (18)$$

In consequence, the coefficient D may be obtained by adding the coefficients B and H and further shifting a result obtained thereby by 1 bit in the lower-bit direction. Moreover, the coefficient F may be obtained by subtracting the coefficients H from B and by further shifting a result obtained thereby by 1 bit in the lower bit direction.

Figure 6:
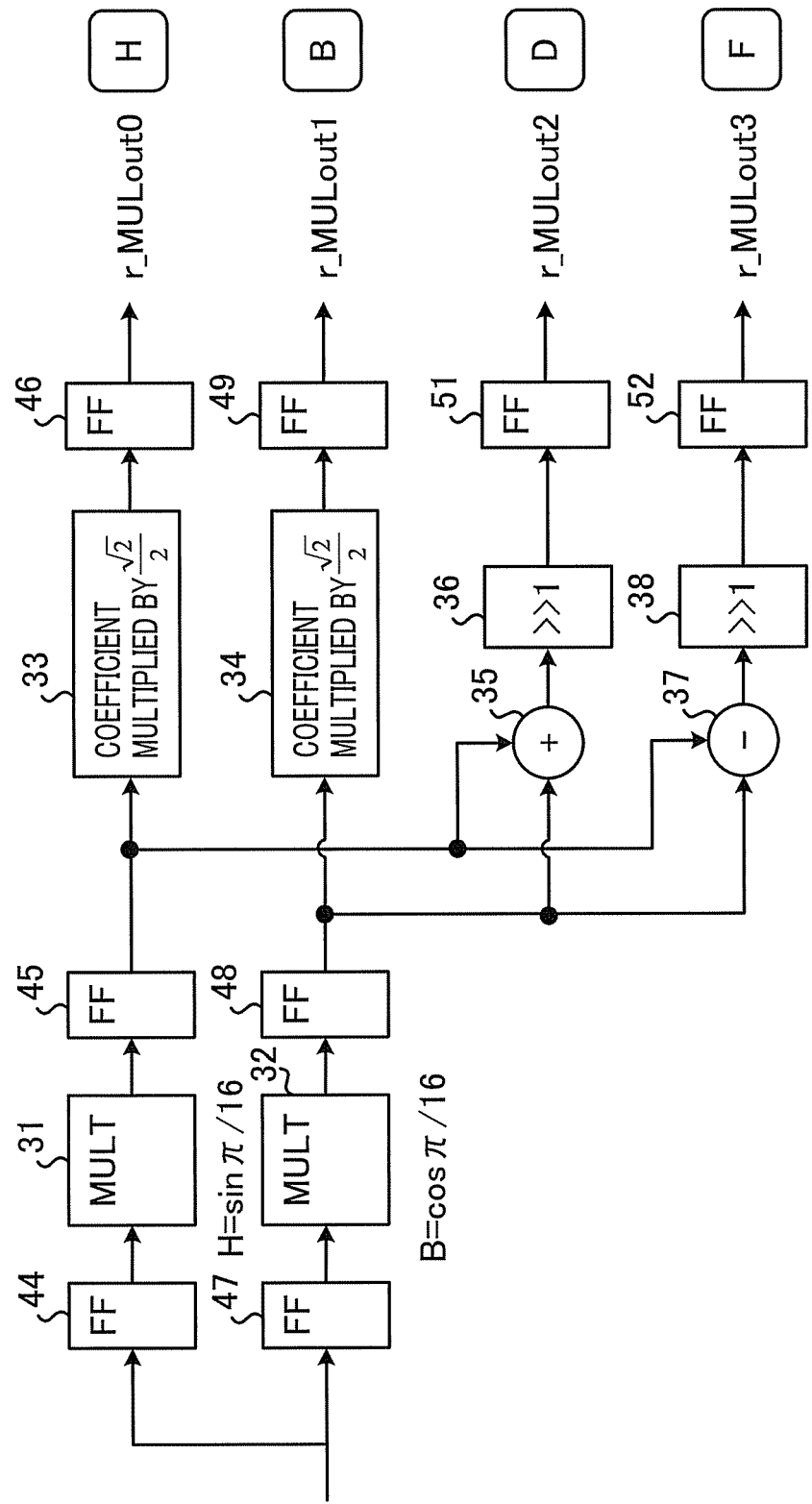
FIG. 6 illustrates a logical data flow of the multiplication circuit unit in FIG. 2 in a case of an MPEG1 standard, an MPEG2 standard or an MPEG4 standard.

FIG. 6 illustrates a logical data flow of the multiplication circuit unit in FIG. 2 according to the MPEG1 standard, the MPEG2 standard or the MPEG4 standard. As shown in FIG. 6, a result of the multiplication by the coefficient H and a result of the multiplication by the coefficient B may be obtained by defining the multiplication coefficients of the first-first variable coefficient multiplier 31 and the first-second variable multiplier 32 as the coefficients H and B, respectively, and by selecting the output of the first-first fixed coefficient multiplier 33 and the output of the first-second fixed coefficient multiplier 34. Furthermore, a result of the multiplication by the coefficient D and a result of the multiplication by the coefficient F may be obtained by adding the result of the multiplication by the coefficient H and the result of the multiplication by the coefficient B by the first-first adder/subtractor 35, by subtracting the result of the multiplication by the coefficient H from the result of the multiplication by the coefficient B by the first-second adder/subtractor 37, and by shifting the respective calculation results by 1 bit in the lower-bit direction by the first-first bit shifter 36 and the first-second bit shifter 38.

Based on H*f[7], F*f[7], D*f[7], and B*f[7] being inputted from the multiplication circuit units 12 and 18 in FIG. 1, an addition of H*f[7], a subtraction of F*f[7], an addition of D*f[7], and a subtraction of B*f[7] are performed by the second-fifth adder/subtractor 67, the second-sixth adder/subtractor 68, the second-seventh adder/subtractor 69, and the second-eighth adder/subtractor 70 in FIG. 3, respectively, in the cumulative addition units 13 and 19 in FIG. 1. Based on G*f[6] and C*f[6] being inputted, an addition of G*f[6], a subtraction of C*f[6], an addition of C*f[6], and a subtraction of G*f[6] are performed by the second-first adder/subtractor 63, the second-second adder/subtractor 64, the second-third adder/subtractor 65, and the second-fourth adder/subtractor 66 in FIG. 3, respectively.

Based on H*f[5], F*f[5], D*f[5] and B*f[5] being inputted, an addition of F*f[5], a subtraction of B×f[5], an addition of H*f[5], and an addition of D*f[5] are performed by the second-fifth adder/subtractor 67, the second-sixth adder/subtractor 68, the second-seventh adder/subtractor 69, and the second-eighth adder/subtractor 70 in FIG. 3, respectively. Based on G*f[2] and C*f[2] being inputted, an addition of C*f[2], an addition of G*f[2], a subtraction of G*f[2], and a subtraction of C*f[2] are performed by the second-first adder/subtractor 63, the second-second adder/subtractor 64, the second-third adder/subtractor 65, and the second-fourth adder/subtractor 66 in FIG. 3, respectively.

Based on H*f[3], F*f[3], D*f[3], and B*f[3] being inputted, an addition of D*f[3], a subtraction of H*f[3], a subtraction of B*f[3], and a subtraction of F*f[3] are performed by the second-fifth adder/subtractor 67, the second-sixth adder/subtractor 68, the second-seventh adder/subtractor 69, and the second-eighth adder/subtractor 70 in FIG. 3, respectively. Based on E×f[4] being inputted, an addition of E×f[4], a subtraction of E*f[4], a subtraction of E*f[4], and an addition of E*f[4] are performed by the second-first adder/subtractor 63, the second-second adder/subtractor 64, the second-third adder/subtractor 65, and the second-fourth adder/subtractor 66 in FIG. 3, respectively.

Based on H*f[1], F*f[1], D*f[1], and B*f[1] being inputted, an addition of B*f[1], an addition of D*f[1], an addition of F*f[1], and an addition of H*f[1] are performed by the second-fifth adder/subtractor 67, the second-sixth adder/subtractor 68, the second-seventh adder/subtractor 69, and the second-eighth adder/subtractor 70 in FIG. 3, respectively. Based on A*f[0] being inputted, an addition of A*f[0] is performed by the second-first adder/subtractor 63, the second-second adder/subtractor 64, the second-third adder/subtractor 65, and the second-fourth adder/subtractor 66 in FIG. 3. The input signals from these multiplication circuit units 12 and 18 in FIG. 1 are distributed to the respective adder/subtractors by the second-first selector 62.

The butterfly/post-processing units 14 and 20 in FIG. 1 perform butterfly calculations, based on T[0] to T[3] and R[0] to R[3] being inputted from the cumulative addition units 13 and 19 in FIG. 1. In the butterfly calculations, an addition of T[0] and R[0] is performed by the third-first adder/subtractor 94, an addition of T[1] and R[1] is performed by the third-second adder/subtractor 96, an addition of T[2] and R[2] is performed by the third-third adder-subtractor 98, and an addition of T[3] and R[3] is performed by the third-fourth adder-subtractor 100, in FIG. 4, respectively. Moreover, a subtraction of R[3] from T[3] is performed by the third-fifth adder/subtractor 102, a subtraction of R[2] from T[2] is performed by the third-sixth adder/subtractor 104, a subtraction of R[1] from T[1] is performed by the third-seventh adder-subtractor 106, and a subtraction of R[0] from T[0] is performed by the third-eighth adder-subtractor 108, in FIG. 4, respectively. The input signals from these multiplication circuit units 13 and 19 in FIG. 1 are distributed to the respective adder/subtractors by the third-first selector 92 in FIG. 4.

Results of the calculations P[0] to P[7] by the respective adder/subtractors are again returned to the first-third selector 92 in FIG. 4, in a case of the first butterfly/post processing unit in FIG. 1. Then, the round-off process represented by Equation (10) is performed, as a post-process, on the returned P[0] to P[7] in the first butterfly/post-processing unit 14 in FIG. 1. Since the transposition RAM 16 is a 18-bit structure in a case of the MPEG1 standard, the MPEG2 standard or the MPEG4 standard, P[0] to P[7] each having 20 bits are rounded off to 18 bits through the round-off process. Therefore, both x and y in Equation 10 are 2.

2 is added to each of P[0] to P[7] each having 20 bits by the third-first adder/subtractor 94, the third-second adder/subtractor 96, the third-third adder/subtractor 98, the third-fourth adder/subtractor 100, the third-fifth adder/subtractor 102, the third-sixth adder/subtractor 104, the third-seventh adder/subtractor 106, and the third-eighth adder/subtractor 108 in FIG. 4. Thereafter P[0] to P[7] are shifted by 2 bits in the lower bit direction by the third-first bit shifter 93, the third-second bit shifter 95, the third-third bit shifter 97, the third-fourth bit shifter 99, the third-fifth bit shifter 101, the third-sixth bit shifter 103, the third-seventh bit shifter 105, and the third-eighth bit shifter 107 in FIG. 4.

In the serial output unit 21 in FIG. 1, based on P[0] to P[7] being inputted from the second butterfly/post-processing unit 20 in FIG. 1, for example, P[0] and P[1] may be selected by the fourth-first selector 122 and the fourth-second selector 123, and P[0] and P[1] may be saved into the fourth-first flip-flop 126 and the fourth-second flip-flop 127 in FIG. 5. For example, P[2] to P[7] may be outputted, once in every cycle, in the order of P[7], P[6], P[5], P[4], P[3], and P[2], via the fourth-third selector 124 and the fourth-fourth selector 125 in FIG. 5. Moreover, for example, P[1] and P[0] may be outputted subsequent to P[2] thus outputted, once in every cycle, in the same order as disclosed above, via the fourth-third selector 124 and the fourth-fourth selector 125 in FIG. 5.

An operation of the multiplication circuit unit in FIG. 2 in the case of the VC-1 standard will be disclosed. A block size, used as a unit in the inverse transform process, is 8*8, 8*4, 4*8, and 4*4. An 8*4 inverse transform process is achieved by performing a one-dimensional horizontal 8*8 inverse transform process four times and, after data is stored in the transposition RAM, by performing a one-dimensional vertical 4*4 inverse transform process eight times. A 4*8 inverse transform process is achieved by performing a one-dimensional horizontal 4*4 inverse transform process eight times and, after the data is stored in the transposition RAM, by performing a one-dimensional vertical 8*8 inverse transform process four times. A process flow thereof is the same as the case of the MPEG1 standard, the MPEG2 standard or the MPEG4 standard.

Operations of the multiplication circuit units 12 and 18 in FIG. 1 in the 8*8 inverse transform process will be disclosed in the following manner. When f[0] is multiplied by the coefficient A, 12 (see Table 1) is set, as the multiplication coefficient A, for the first-first variable coefficient multiplier 31 in FIG. 2. Then, the first-first selector 39 selects the output signal outputted from the first-second flip-flop 45. Note that a case where f[4] is multiplied by the coefficient E is the same as a case where f[0] is multiplied by the coefficient A.

When f[2] is concurrently multiplied by the coefficient C and the coefficient G, 16 (see Table 1) is set, as the multiplication coefficient C, for the first-first variable coefficient multiplier 31 in FIGS. 2 and 6 (see Table 1) is set, as the multiplication coefficient G, for the first-second variable coefficient multiplier 32. Then, the output signal from the first-second flip-flop 45 and the output signal from the first-fifth flip-flop 48 are selected by the first-first selector 39 and the first-second selector 40, respectively. Note that a case where f[6] is concurrently multiplied by the coefficient C and the coefficient G is the same as a case where f[2] is concurrently multiplied by the coefficient C and the coefficient G.

Figure 7:
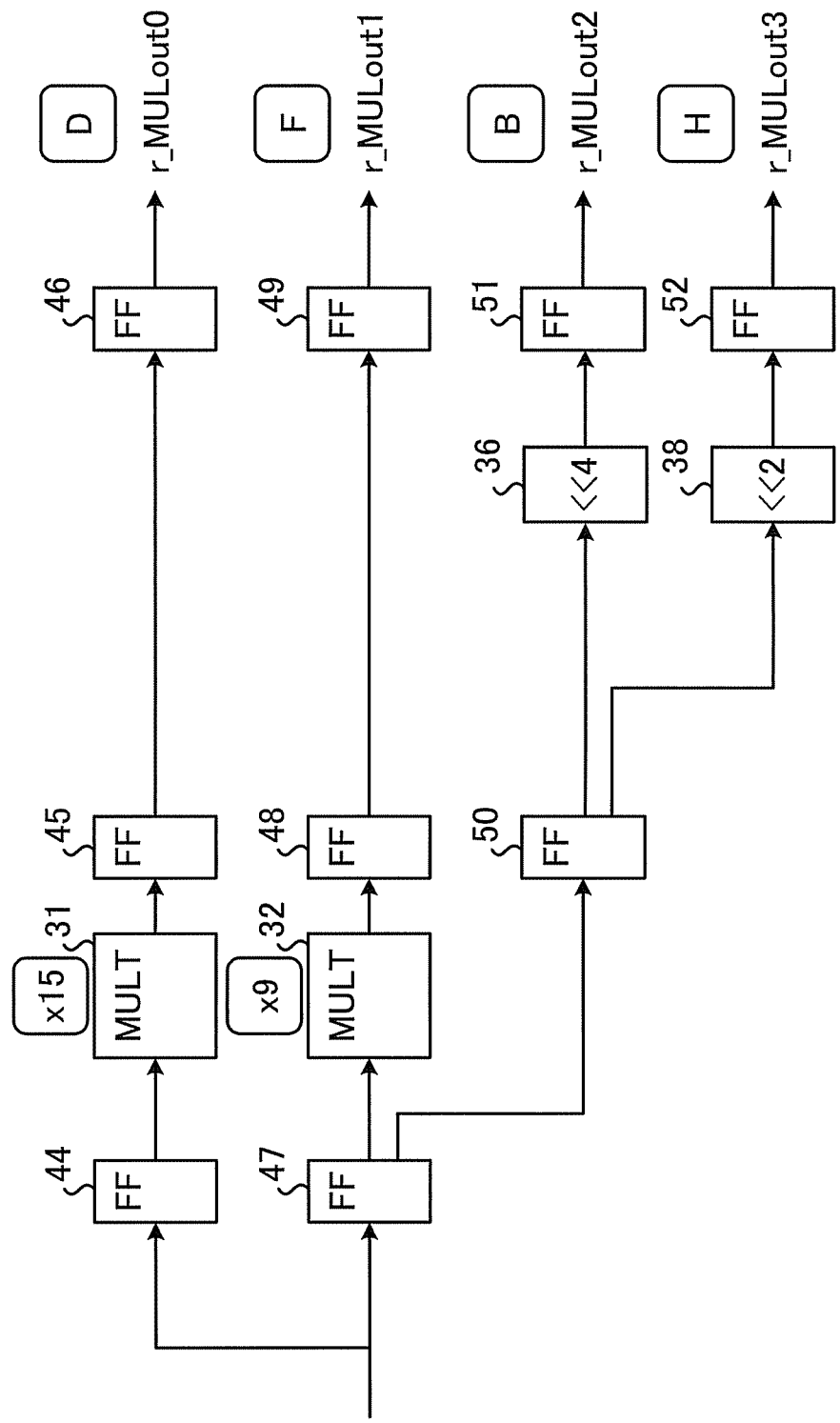
FIG. 7 illustrates a logical data flow of the multiplication circuit unit in FIG. 2 in a case of a VC-1 standard.

When f[1], f[3], f[5], and f[7] are concurrently multiplied by the coefficient B, the coefficient D, the coefficient F, and the coefficient H, the coefficient B is 16, the coefficient D is 15, the coefficient F is 9, and the coefficient H is 4, respectively, based upon Table 1. Multiplying 16 is the same as a bit shift by 4 bits in an upper bit direction. Note that, multiplying 4 is the same as a bit shift by 2 bits in the upper bit direction. FIG. 7 illustrates a logical data flow of the multiplication circuit unit in FIG. 2 in the case of the VC-1 standard.

As shown in FIG. 7, a result of the multiplication by the coefficient D and a result of the multiplication by the coefficient F may be obtained by defining the multiplication coefficients of the first-first variable coefficient multiplier 31 and the first-second variable coefficient multiplier 32 as 15 for the coefficient D and as 9 for the coefficient F, respectively, and by selecting the output signal outputted from the first-second flip-flop 45 and the output signal outputted from the first-fifth flip-flop 48.

As further shown in FIG. 7, a result of the multiplication by the coefficient B may be obtained by shifting the output signal from the first-seventh flip-flop 50 by 4 bits in the upper bit direction by the first-first bit shifter 36. Furthermore, a result of the multiplication by the coefficient H may be obtained by shifting the output signal from the first-seventh flip-flop 50 by 2 bits in the upper bit direction by the first-second bit shifter 38. Since the number of the coefficients that are concurrently multiplied by the input signal is one or two in the 4*4 inverse transform process, a result of the calculation may be obtained with use of the first-first variable coefficient multiplier 31 and the first-second variable coefficient multiplier 32.

Operations of the cumulative addition units 13 and 19 in FIG. 1 in the 8*8 inverse transform process are the same as the case of the MPEG1 standard, the MPEG2 standard or the MPEG4 standard. In a case of the 4*4 inverse transform process, the cumulative addition units 13 and 19 in FIG. 1 perform calculations represented by Equation 9. Based on D*f[3] and B*f[3] being inputted from the multiplication circuit units 12 and 18 in FIG. 1, an addition of D*f[3] and a subtraction of B*f[3] are performed by the second-fifth adder/subtractor 67 and the second-sixth adder/subtractor 68 shown in FIG. 3, respectively. Based on C*f[2] being inputted, an addition of C*f[2] and a subtraction of C*f[2] are performed by the second-first adder/subtractor 63 and the second-second adder/subtractor 64 in FIG. 3, respectively.

Based on D*f[1] and B*f[1] being inputted, an addition of B*f[1] and an addition of D*f[1] are performed by the second-fifth adder/subtractor 67 and the second-sixth adder/subtractor 68 in FIG. 3, respectively. Based on A*f[0] being inputted, an addition of A* f[0] is performed by the second-first adder/subtractor 63 and the second-second adder/subtractor 64 in FIG. 3. The input signals from these multiplication circuit units 12 and 18 in FIG. 1 are distributed to the respective adder/subtractors by the second-first selector 62 in FIG. 3.

Operations in the butterfly calculations by the butterfly/post-processing units 14 and 20 in FIG. 1 in the 8×8 inverse transform process are the same as the case of the MPEG1 standard, the MPEG2 standard or the MPEG4 standard. In a butterfly calculation in the 4*4 inverse transform process, a calculation represented by Equation (19) shown below is performed. Note that data of P[2] and P[3] are stored in P[6] and P[7] owing to output timing at the time of a vertical process, respectively.

$$P[0]=T[0]+R[0]$$

$$P[1]=T[1]+R[1]$$

$$P[7]=T[0]-R[0]$$

$$P[6]=T[1]-R[1] \quad (19)$$

Upon a calculation represented by Equation (19) based on T[0], T[1], R[0], and R[1] being inputted from the cumulative addition unit 13 and 19 in FIG. 1, an addition of T[0] and R[0] and an addition of T[1] and R[1] are performed by the third-first adder/subtractor 94 and the third-second adder/subtractor 96 in FIG. 4, respectively, in the butterfly/post-processing units 14 and 20 in FIG. 1. Moreover, a subtraction of R[0] from T[0] and a subtraction of R[1] from T[1] are performed by the third-eighth adder/subtractor 108 and the third-seventh adder/subtractor 106 in FIG. 4, respectively. The input signals from these multiplication circuit units 13 and 19 in FIG. 1 are distributed to the respective adder/subtractors by the third-first selector 92 in FIG. 4.

Furthermore, in the butterfly/post-processing units 14 and 20 in FIG. 1, the round-off process represented by Equation (10) is performed, as the post-process, after completion of the butterfly calculations in a case of the 8×8 inverse transform process, and a round-off process represented by Equation (20) shown below is performed in the case of the 4×4 inverse transform process.

$$P[0]=(P[0]+x)>>y$$

$$P[1]=(P[1]+x)>>y$$

$$P[6]=(P[6]+x)>>y$$

$$P[7]=(P[7]+x)>>y \quad (20)$$

In the VC-1 standard, different values are applied to x and y in Equation (10) and Equation (20) with respect to a horizontal process and in the vertical process. In the horizontal process, x is 4 and y is 3. That is to say, 4 are added to a result of the butterfly calculations, and a bit shift by 3 bits in the lower bit direction is further performed. In the vertical process, x is 64 or 65 and y is 7. That is to say, one of 64 or 65 is added to the result of the butterfly calculations, and a bit shift by 7 bits in the lower bit direction is further performed. Whether 64 is added or 65 is added in the vertical process is determined based upon the block size and pixel positions and selected based on the mode switching signals.

After completion of the round-off process, the third-first range over error detection unit 118 in FIG. 4 performs the range over error detection. In the horizontal process, an error is detected if any one of P[0] to P[7] (in the case of 8×8) or any one of p[0], P[1], P[6], and P[7] (in the case of 4×4) is greater than 2^12−1 or less than −2^12. In the vertical process, an detected if any one of P[0] to P[7] (in the case of 8×8) or any one of p[0], P[1], P[6], and P[7] (in the case of 4×4) is greater than 2^9−1 or less than −2^9.

An operation of the serial output unit 21 in FIG. 1 in the 8*8 inverse transform process are the same as the case of the MPEG1 standard, the MPEG2 standard or the MPEG4 standard. For example, in the case of the 4*4 inverse transform process, P[0], P[1], P[6], and P[7] may be outputted, once in every cycle, through the fourth-third selector 124 and the fourth-fourth selector 125 in the order of P[7], P[6], P[1], and P[0]. Note that P[7] and P[6] are outputted as original P[3] and P[2].

An operation of the multiplication circuit unit in FIG. 2 according to the AVS standard will be disclosed. The block size, used as a unit in the inverse transform process, is 8*8. A process flow thereof is the same as the case of the MPEG1 standard, the MPEG2 standard or the MPEG4 standard. Operations of the multiplication circuit units 12 and 18 in FIG. 1 will be disclosed in the following manner. When f[0] is multiplied by the coefficient A, 8 (see Table 1) is set, as the multiplication coefficient A, for the first-first variable coefficient multiplier 31 in FIG. 2. Then, the first-first selector 39 in FIG. 2 selects the output signal outputted from the first-second flip-flop 45 in FIG. 2. Note that a case where f[4] is multiplied by the coefficient E is the same as a case where f[0] is multiplied by the coefficient A.

When f[2] is concurrently multiplied by the coefficient C and the coefficient G, 10 (see Table 1) is set, as the multiplication coefficient C, for the first-first variable coefficient multiplier 31 in FIGS. 2 and 4 (see Table 1) is set, as the multiplication coefficient G, for the first-second variable coefficient multiplier 32 in FIG. 2. Then the output signal from the first-second flip-flop 45 and the output signal from the first-fifth flip-flop 48 in FIG. 2 are selected by the first-first selector 39 and the first-second selector 40 in FIG. 2, respectively. Note that a case where f[6] is concurrently multiplied by the coefficient C and the coefficient G is the same as a case where f[2] is concurrently multiplied by the coefficient C and the coefficient G.

When f[1], f[3], f[5], and f[7] are concurrently multiplied by the coefficient B, coefficient D, coefficient F, and coefficient H, the coefficient B is 10, the coefficient D is 9, the coefficient F is 6, and the coefficient H is 2, respectively, based upon Table 1. Multiplying 10 is the same as adding a result obtained by multiplying 9 and a result obtained by multiplying 1. Moreover, multiplying 2 is the same as a bit shift by 1 bit in the upper bit direction.

Figure 8:
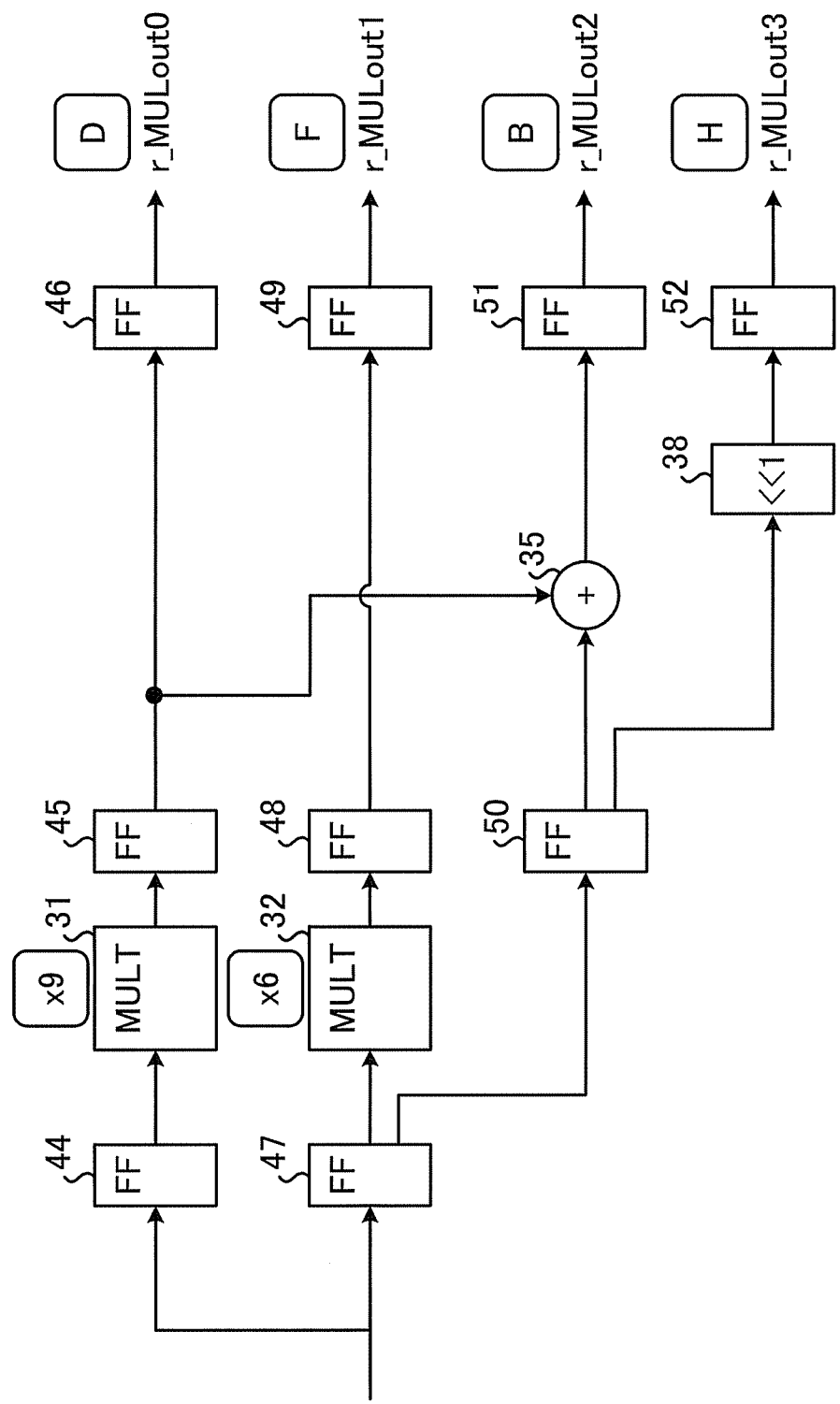
FIG. 8 illustrates a logical data flow of the multiplication circuit unit in FIG. 2 in a case of an AVS standard.

FIG. 8 illustrates a logical data flow of the multiplication circuit unit in FIG. 2 in a case of the AVS standard.

As shown in FIG. 8, a result of the multiplication by the coefficient D and a result of the multiplication by the coefficient F may be obtained by defining the multiplication coefficients of the first-first variable coefficient multiplier 31 and the first-second variable coefficient multiplier 32 as 9 for the coefficient D and 6 for the coefficient F, respectively, and by selecting the output signal outputted from the first-second flip-flop 45 and the output signal outputted from the first-fifth flip-flop 48. Then a result of the multiplication by the coefficient B may be obtained by adding the output signal from the first-seventh flip-flop 50 and the output signal from the first-second flip-flop 45 (the result of the multiplication of the first-first variable coefficient multiplier 31) with use of the first-first adder/subtractor 35. Next a result of the multiplication by the coefficient H may be obtained by shifting the output signal from the first-seventh flip-flop 50 by 1 bit in the upper bit direction with use of the first-second bit shifter 38.

Operations of the cumulative addition units 13 and 19 in FIG. 1 are the same as the case of the MPEG1 standard, the MPEG2 standard or the MPEG4 standard. Operations of the butterfly calculations in the butterfly/post-processing units 14 and 20 in FIG. 1 are the same as those according to the MPEG1 standard, the MPEG2 standard or the MPEG4 standard. After completion of the butterfly calculations, the round-off process represented by Equation (10) is performed, as the post-process, by the butterfly/post-processing units 14 and 20 in FIG. 1. In the AVS standard, different values are applied to x and y in Equation (10) with respect to the horizontal process and the vertical process.

In the horizontal process, x is 4 and y is 3. That is to say, 4 are added to a result of the butterfly calculations and a bit shift by 3 bits in the lower bit direction is further performed. Note that, after adding 4, a value obtained by the addition is clipped with $-2^{15}$ to $2^{15}-1$, the bit shift is performed. In the vertical process, x is 64 and y is 7. That is to say, 64 is added to the result of the butterfly calculations and a bit shift by 7 bits in the lower bit direction is further performed. Note that, after adding 64, a value obtained by the addition is clipped with $-2^{15}$ to $2^{15}-1$, the bit shift is performed. An operation of the serial output unit 21 is the same as the case of the MPEG1 standard, the MPEG2 standard or the MPEG4 standard.

(An operation in a case of the H.264 standard) Two block sizes, that is, 8*8 and 4*4, are used as units in the inverse transform process. Roughly speaking, the 4*4 inverse transform process is divided into the following operations, that is, Operation 1 of performing a calculation represented by Equation (21) shown below, Operation 2 of performing a calculation represented by Equation (19), and the round-off process of performing a calculation represented by Equation (20). Like the other standards, Operation 1 and Operation 2 are performed twice, as the vertical process and the horizontal process, before and after a process of storing data in the transposition RAM 16. The round-off process may be performed once in the serial output unit 21 after the vertical inverse transform process.

$$T[0]=f[0]+f[2]$$

$$T[1]=f[0]-f[2]$$

$$R[0]=f[1]+(f[3]>>1)$$

$$R[1]=(f[1]>>1)-f[3] \quad (21)$$

As further shown in FIG. 8, operations of multiplication circuit units 12 and 18 in FIG. 1 in the 4*4 inverse transform process will be disclosed in the following manner. 1 is set as the multiplication coefficient of the first-first variable coefficient multiplier 31. 0.5 is set as the multiplication coefficient of the first-second variable coefficient multiplier 32. Multiplying 0.5 is the same as a bit shift by 1 bit in the lower bit direction. Consequently, f[0], f[1], f[2], f[3], (f[1]>>1) and (f[3]>>1) are outputted from the multiplication circuit units 12 and 18.

As further shown in FIG. 8, in the 4×4 inverse transform process, the calculation represented by Equation (21) is performed by the cumulative addition units 13 and 19 in FIG. 1. Based on (f[3]>>1) and f[3] being inputted from the multiplication circuit units 12 and 18 in FIG. 1, an addition of (f[3]>>1) and a subtraction of f[3] are performed by the second-fifth adder/subtractor 67 and the second-sixth adder/subtractor 68 in FIG. 3, respectively. Based on f[2] being inputted, an addition of f[2] and a subtraction of f[2] are performed by the second-first adder/subtractor 63 and the second-second adder/subtractor 64 in FIG. 3, respectively.

Based on f[1] and (f[1]>>1) being inputted, an addition of f[1] and an add (f[1]>>1) are performed by the second-fifth adder/subtractor 67 and the second-sixth adder/subtractor 68 in FIG. 3, respectively. Based on f[0] being inputted, an addition of f[0] is performed by the second-first adder/subtractor 63 and by the second-second adder/subtractor 64 in FIG. 3. The input signals from these multiplication circuit units 12 and 18 in FIG. 1 are distributed to the respective adder/subtractors by the third-first selector 62 in FIG. 3. Based on a left-hand member of Equation (21) being obtained, the second-first range over error detection unit 80 in FIG. 3 performs the range over error detection. If T[0], T[1], R[0], or R[1] is greater than $2^{15}-1$ or less than $-2^{15}$, the range over error is detected.

Operations in the butterfly calculations by the butterfly/post-processing units 14 and 20 in FIG. 1 in the 4*4 inverse transform process are the same as those of the 4*4 inverse transform process in the case of the VC-1 standard. Note that the third-first range over error detection unit 118 in FIG. 4 performs the range over error detection at the time of the butterfly calculations. The range over error is detected if P[0], P[1], P[6] or P[7] is greater than $2^{15}-1$ or less than $-2^{15}$ in the horizontal process by the first butterfly/post-processing unit 14 in FIG. 1. The range over error is detected if P[0], P[1], P[6] or P[7] is greater than 2^15−33 or less than −2^15 in the vertical process by the second butterfly/post-processing unit 20 in FIG. 1.

In the 4*4 inverse transform process, the serial output unit 21 in FIG. 1 performs the round-off process. In the H.264 standard, x in Equation (20) is 32 and y in Equation (20) is 6. To perform this round-off process, at the serial output unit 21 in FIG. 1, P[0], P[1], P[6], and P[7] may be, for example, passed to the right 5-bit shifter 128 in FIG. 5 via the fourth-third selector 124 in FIG. 5, and P[0], P[1], P[6], and P[7] are shifted by 5 bits in the lower bit direction. Then, 1 is added to P[0], P[1], P[6], and P[7] by the +1 adder 129 in FIG. 5. Next, P[0], P[1], P[6], and P[7] are shifted by 1 bit in the lower bit direction by the right 1-bit shifter 130 in FIG. 5. Thereafter, for example, P[0], P[1], P[6], and P[7] may be outputted, via the fourth-fourth selector 125 in FIG. 5, in the order of P[7], P[6], P[1], and P[0], once in every cycle. Note that P[7] and P[6] are outputted as original P[3] and P[2]

Roughly speaking, the 8*8 inverse transform process is divided into the following operations, that is, Operation 1 of performing a calculation represented by Equation (22) shown below, Operation 2 of performing a calculation represented by Equation (23) shown below, Operation 3 of performing the calculation represented by Equation (7), and the round-off process represented by Equation (10). Like the other standards, Operation 1, Operation 2, and Operation 3 are performed twice, as the horizontal process and the vertical process, before and after a process of storing data in the transposition RAM 16. The serial output unit 21 may perform the round-off process once, after the vertical inverse transform process.

$$T[0]=f[0]+f[4]$$

$$T[1]=f[0]-f[4]$$

$$T[2]=(f[2]>>1)-f[6]$$

$$T[3]=f[2]+(f[6]>>1)$$

$$R[0]=f[3]+f[5]+(f[1]+(f[1]>>1))$$

$$R[1]=-f[1]+f[7]+(f[5]+(f[5]>>1))$$

$$R[2]=f[1]+f[7]-(f[3]+(f[3]>>1))$$

$$R[3]=-f[3]+f[5]-(f[7]+(f[7]>>1)) \quad (22)$$

$$T[0]=T[0]+T[3]$$

$$T[1]=T[1]+T[2]$$

$$T[2]=T[1]-T[2]$$

$$T[3]=T[0]-T[3]$$

$$R[0]=R[0]-(R[3]>>2)$$

$$R[1]=(R[2]>>2)-R[1]$$

$$R[2]=R[2]+(R[1]>>2)$$

$$R[3]=R[3]+(R[0]>>2) \quad (23)$$

Figure 9:
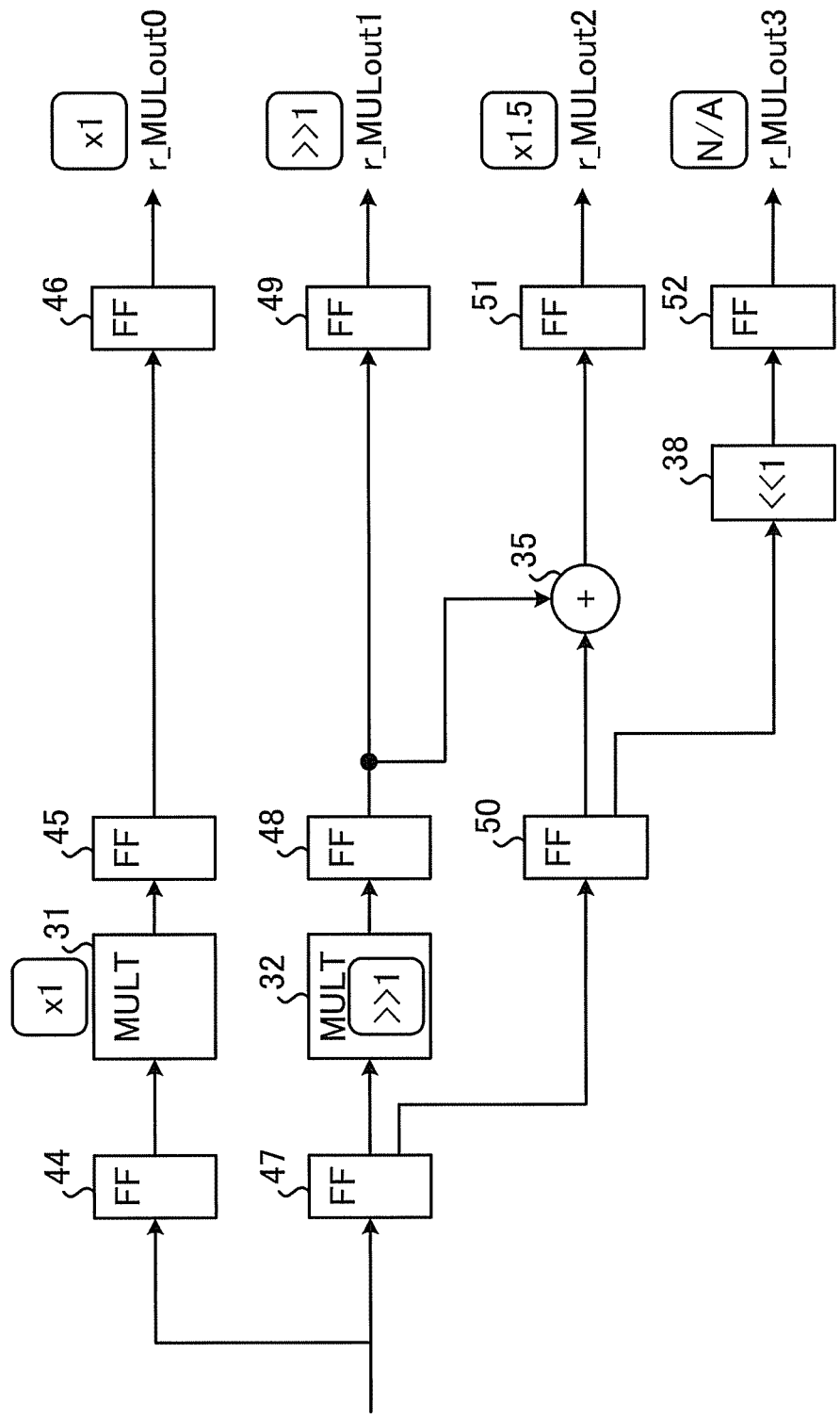
FIG. 9 illustrates a logical data flow of the multiplication circuit unit in FIG. 2 in a case of an H.264 standard.

FIG. 9 illustrates a logical data flow of the multiplication circuit unit in FIG. 2 in the case of the H.264 standard.

As shown in FIG. 9, 1 is set as the multiplication coefficient of the first-first variable coefficient multiplier 31. By setting 1, f[0] to f[7] are outputted from the multiplication circuit units 12 and 18 in FIG. 1. Moreover, 0.5 is set as the multiplication coefficient of the first-second variable coefficient multiplier 32. Multiplying 0.5 is the same as a bit shift by 1 bit in the lower bit direction. Consequently, (f[2]>>1) and (f[6]>>1) are outputted from the multiplication circuit units 12 and 18 in FIG. 1. Furthermore, based on the output signal of the first-seventh flop-flop 50 and the output signal from the first-fifth flip-flop 48 (the output of the first-second variable coefficient multiplier 32) being added by the first-first adder/subtractor, (f[1]+(f[1]>>1)), (f[3]+(f[3]>>1)), (f[5]+(f[5]>>1)), and (f[7]+(7[7]>>1)) are outputted from the multiplication circuit units 12 and 18.

In the 8×8 inverse transform process, the calculation represented by Equation (22) is performed by the cumulative addition units 13 and 19 in FIG. 1. Based on f[7] and (f[7]+(f[7]>>1)) being inputted from the multiplication circuit units 12 and 18 in FIG. 1, an addition of f[7], an addition of f[7], and a subtraction of (f[7]+(f[7]>>1)) are performed by the second-sixth adder/subtractor 68, the second-seventh adder/subtractor 69, and the second-eighth adder/subtractor 70 in FIG. 3, respectively. Based on f[6] and (f[6]>>1) being inputted, a subtraction of f[6] and an addition of (f[6]>>1) are performed by the second-third adder/subtractor 65 and the second-fourth adder/subtractor 66 in FIG. 3, respectively.

Based on f[5] and (f[5]+(f[5]>>1)) being inputted, an addition of f[5], an addition of (f[5]+(f[5]>>1)), and an addition of f[5] are performed by the second-fifth adder/subtract 67, the second-sixth adder/subtractor 68, and the second-eighth adder/subtractor 70 in FIG. 3, respectively. Based on f[4] being inputted, an addition of f[4] and a subtraction of f4) are performed by the second-first adder/subtractor 63 and the second-second adder/subtractor 64 in FIG. 3, respectively. Based on f[3] and (f[3]+(f[3]>>1)) being inputted, an addition of f[3], a subtraction of (f[3]+(f[3]>>1)), and a subtraction of f[3] are performed by the second-fifth adder/subtractor 67, the second-seventh adder-subtractor 69, and the second-eighth adder-subtractor 70 in FIG. 3, respectively.

Based on f[2] and (f[2]>>1) being inputted, an addition of (f[2]>>1) and an addition of f[2] are performed by the second-third adder/subtractor 65 and the second-fourth adder-subtractor 66 in FIG. 3, respectively. Based on f[1] and (f[1]+(f[1]>>1)) being inputted, an addition of (f[1]+(f[1]>>1)), a subtraction of f[1], and an addition of f[1] are performed by the second-fifth adder/subtractor 67, the second-sixth adder/subtractor 68, and the second-seventh adder/subtractor 69 in FIG. 3, respectively. Based on f[0] being inputted, an addition of f[0] is performed by the second-first adder/subtractor 63 and by the second-second adder/subtractor 64 in FIG. 3.

The input signals from these multiplication circuit units 12 and 18 in FIG. 1 are distributed to the respective adder/subtractors by the second-first selector 62 in FIG. 3. Based on a left-hand member of Equation (22) being obtained, the second-first range over error detection unit 80 in FIG. 3 performs the range over error detection. If any one of T[1] to T[3] and R[0] to R[3] is greater than 2^15−1 or less than −2^15, the range over error is detected.

First, the intermediate calculation represented by Equation 23 are performed in the butterfly calculations by the butterfly/post-processing units 14 and 20 in FIG. 1 in the 8*8 inverse transform process. Based on T[0] to T[3] and R[0] to R[3] being inputted from the cumulative addition units 13 and 19 in FIG. 1, the butterfly/post-processing units 14 and 20 in FIG. 1 operate in the following manner. T[0] and T[3] are added by the third-eighth adder/subtractor 108 in FIG. 4, and a result of the calculation is newly defined as T[0]. T[1] and T[2] are added by the third-seventh adder/subtractor 106 in FIG. 4, and a result of the calculation is newly defined as T[1].

T[2] is subtracted from T[1] by the third-sixth adder/subtractor 104 in FIG. 4, and a result of the calculation is newly defined as T[2]. T[3] is subtracted from T[0] by the third-fifth adder/subtractor 102, and a result of the calculation is newly defined as T[3].

Moreover, R[3] is shifted by 2 bits in the lower bit direction by the third-first bit shifter 93. If this bit shift is defined as (R[3]>>2), (R[3]>>2) is subtracted from R[0] by the third-first bits in the lower bit direction by the third-second bit shifter 95. If this bit shift is defined as (R[2]>>2), R[1] is subtracted from (R[2]>>2) by the third-second adder/subtractor 96 in FIG. 4, and a result of the calculation is newly defined as R[1].

R[1] is shifted by 2 bits in the lower bit direction by the third-third bit shifter 97 in FIG. 4. If this bit shift is defined as (R[1]>>2), R[2] and (R[1]>>2) are added by the third-third adder/subtractor 98 in FIG. 4, and a result of the calculation is newly defined as R[2]. R[0] is shifted by 2 bits in the lower bit direction by the third-fourth bit shifter 99. If this bit shift is defined as (R[0]>>2), R[3] and (R[0]>>2) are added by the third-fourth adder/subtractor 100 in FIG. 4, and a result of the calculation is newly defined as R[3].

The first-third range over error detection unit 118 in FIG. 4 performs the range over error detection in the intermediate calculation. If any one of T[0] to T[3] and R[0] to R[3] is greater than $2^{15}-1$ or less than $-2^{15}$, the range over error is detected.

Based on completion of the intermediate calculation, modes of the butterfly/post-processing units 14 and 20 in FIG. 1 are switched and a final calculation is performed. T[0] to T[3] and R[0] to R[3] newly obtained by the intermediate calculation are returned to the third-first selector 92 in the final calculation. Then an addition of T[0] and R[0], an addition of T[1] and R[1], an addition of T[2] and R[3], and an addition of T[3] and R[3] are performed by the third-first adder/subtractor 94, the third-second adder/subtractor 96, the third-third adder/subtractor 98, and the third-fourth added/subtractor 100 in FIG. 4, respectively. Then a subtraction of R[3] from T[3], a subtraction of R[2] from T[2], a subtraction of R[1] from T[1], and a subtraction of R[0] from T[0] are performed by the third-fifth adder/subtractor 102, the third-sixth adder/subtractor 104, the third-seventh adder/subtractor 106, and the third-eighth added/subtractor 108 in FIG. 4, respectively. The results of these intermediate calculations are distributed to the respective adder/subtractors by the third-first selector 92 in FIG. 4.

The third-first range over error detection unit 118 in FIG. 4 performs the range over error detection in the final calculation. If P[0] to P[7] are greater than $2^{15}-1$ or less than $-2^{15}$ in the horizontal process by the first butterfly/post-processing unit 14 in FIG. 1, the range over error is detected. If P[0] to P[7] are greater than $2^{15}-33$ or less than $-2^{15}$ in the vertical process by the second butterfly/post-processing unit 20, the range over error is detected.

In the 8×8 inverse transform process, the serial output unit 21 in FIG. 1 performs the round-off process. The round-off process is the same as the case of the 4×4 inverse transform process. Note that, for example, P[0] and P[1] may be saved into the fourth-first flip-flop 126 and the fourth-second flip-flop 127 in FIG. 5 like the case of the MPEG1 standard, the MPEG2 standard or the MPEG4 standard. Then, for example, P[7], P[6], P[5], P[4], P[3], P[2], P[1], and P[0] may be outputted in the order as disclose above, once in every cycle.

Figure 10:
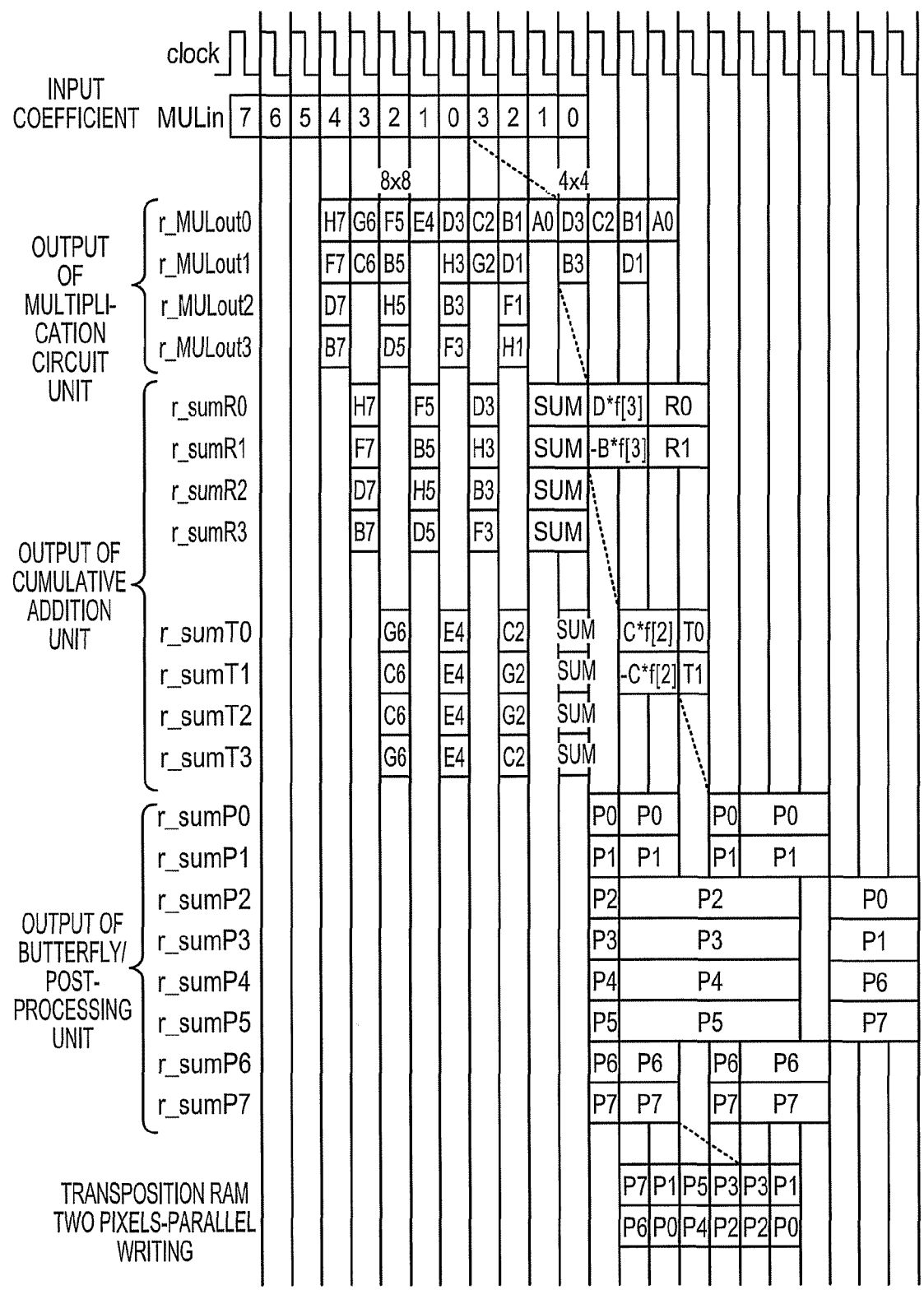
FIG. 10 illustrates a timing chart of an 8×8 horizontal inverse transform process by the inverse transform unit in FIG. 1 in a case of the MPEG1 standard, the MPEG2 standard, the MPEG4 standard, the VC-1 standard, and the AVS standard.
Figure 11:
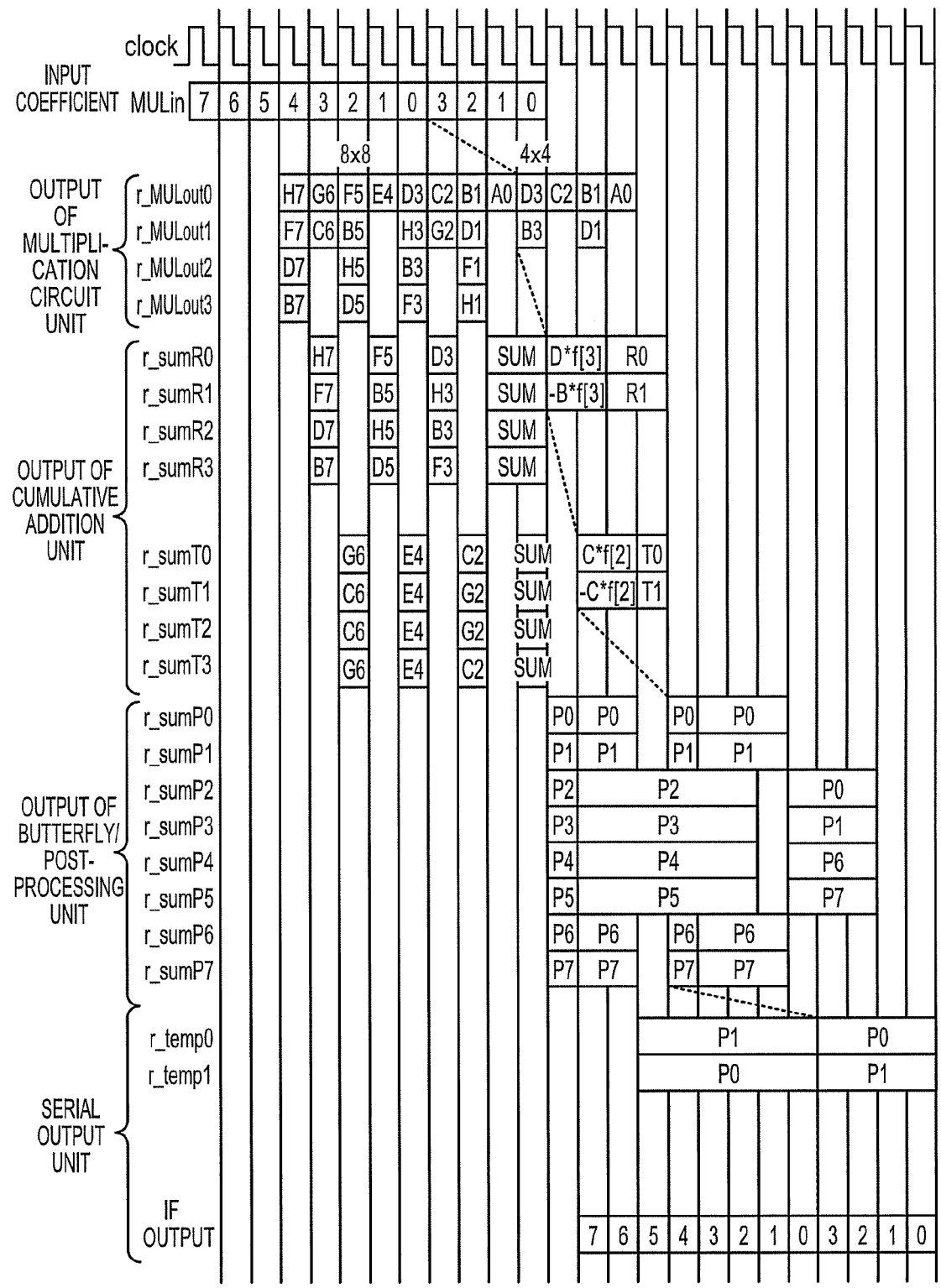
FIG. 11 illustrates a timing chart of an 8×8 vertical inverse transform process by the inverse transform unit in FIG. 1 in the case of the MPEG1 standard, the MPEG2 standard, the MPEG4 standard, the VC-1 standard, and the AVS standard.
Figure 12:
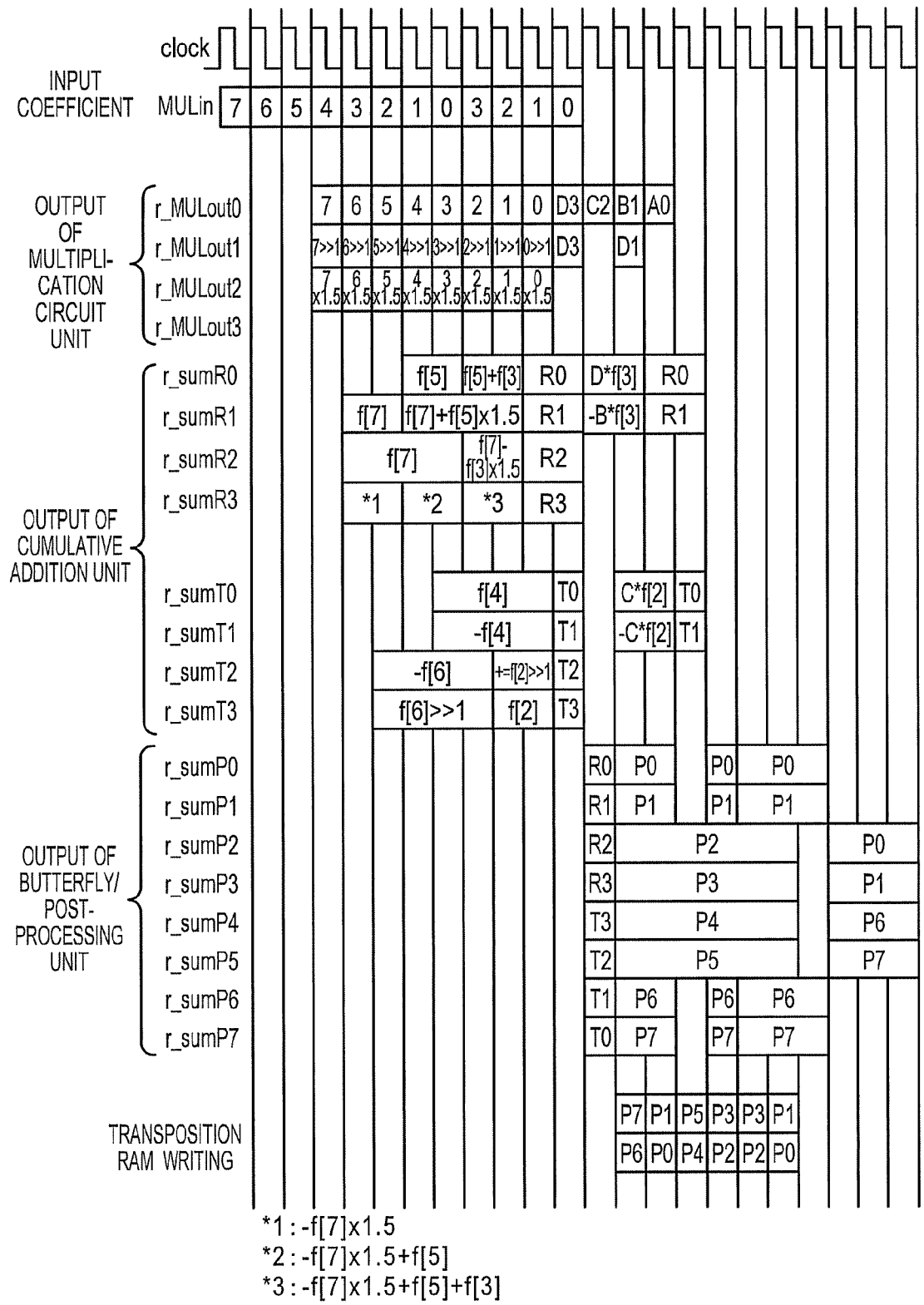
FIG. 12 illustrates a timing chart of an 8×8 horizontal inverse transform process in the case of the H.264 standard.
Figure 13:
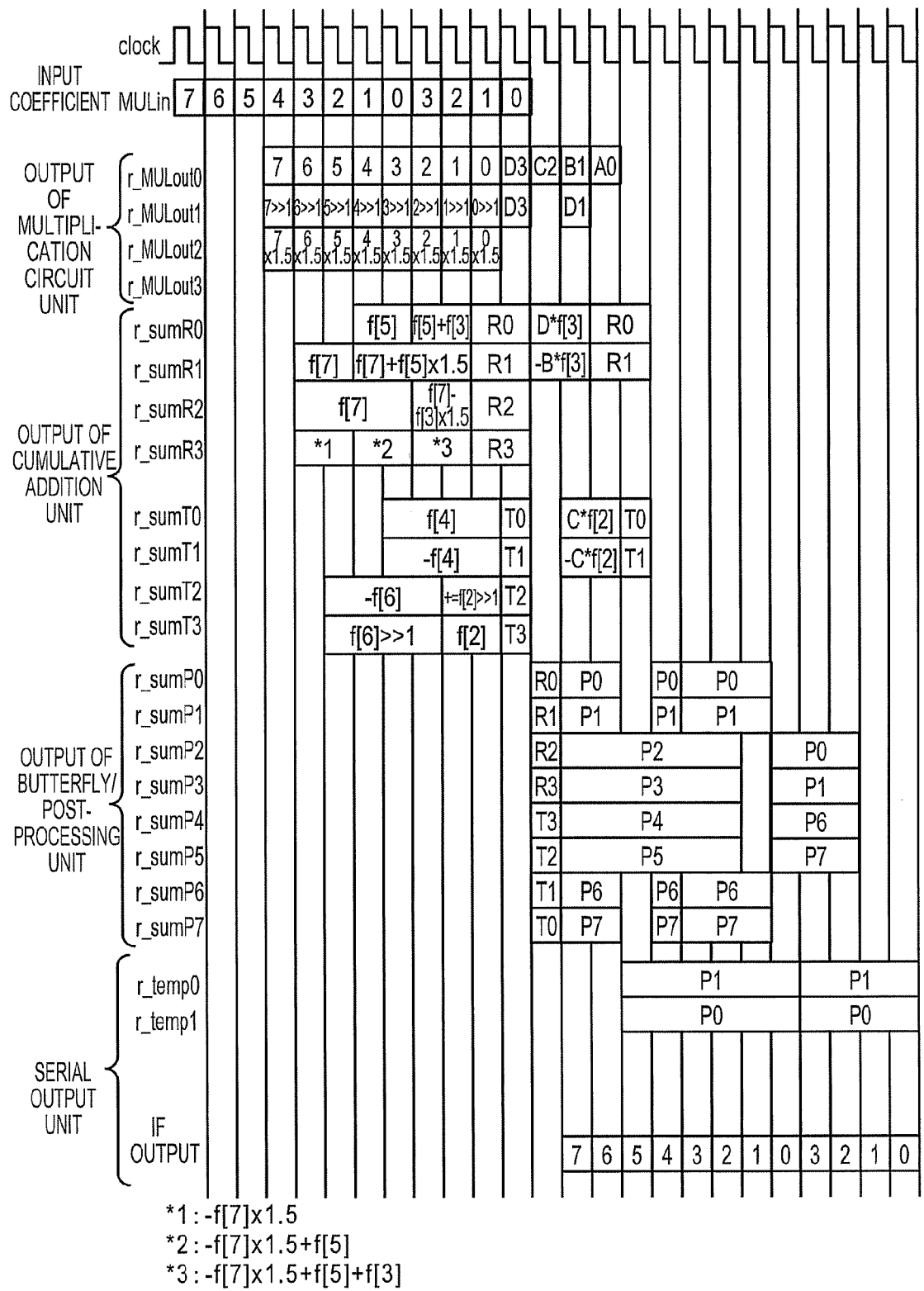
FIG. 13 illustrates a timing chart of an 8×8 vertically inverse transform process in the case of the H.264 standard.

FIG. 10 illustrates a timing chart of the 8×8 horizontal inverse transform process by the inverse transform unit in FIG. 1 in the cases of the MPEG1 standard, the MPEG2 standard, the MPEG4 standard, the VC-1 standard, and the AVS standard. FIG. 11 illustrates a timing chart of the 8*8 vertical inverse transform process by the inverse transform unit in FIG. 1 in the cases of the MPEG1 standard, the MPEG2 standard, the MPEG4 standard, the VC-1 standard, and the AVS standard. FIG. 12 illustrates a timing chart of the 8*8 horizontal inverse transform process in the case of the H.264 standard. FIG. 13 illustrates a timing chart of the 8*8 vertical inverse transform process in the case of the H.264 standard. In FIGS. 10 to 13, the one-dimensional 4*4 inverse transform process (based on 4 pixels) may be once performed after the one-dimensional 8×8 inverse transform process (based on 8 pixels) may be once performed.

Figure 14:
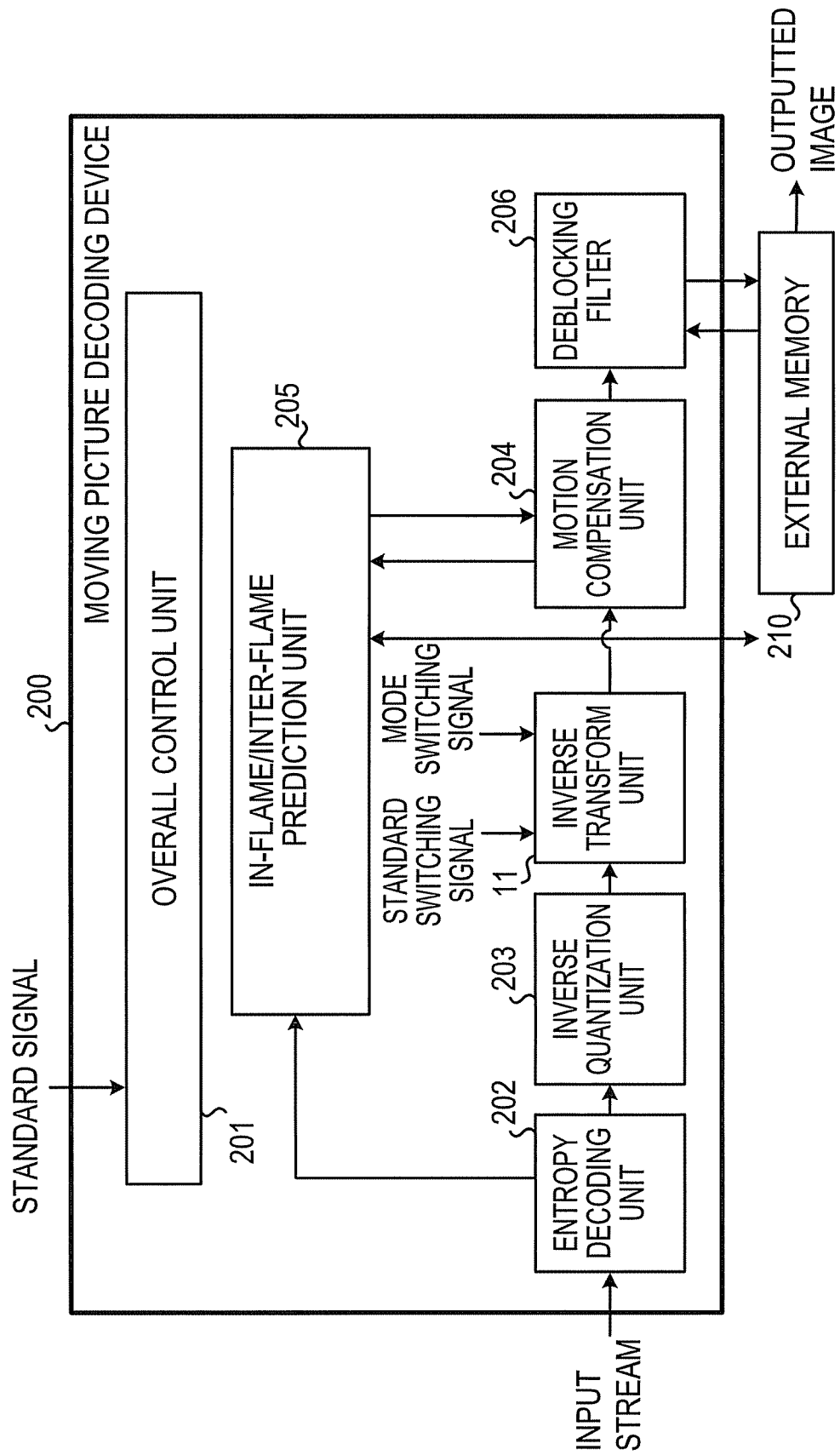
FIG. 14 illustrates one example of a semiconductor device that includes the inverse transform unit in FIG. 1.

FIG. 14 illustrates an example of a semiconductor device that includes the inverse transform unit in FIG. 1. The example illustrated in FIG. 14 is an example where the inverse transform unit according to the embodiment is applied to a moving picture decoding device based on the plurality of image compression standards. As shown in FIG. 14, a moving picture decoding device 200 includes an overall control unit 201, an entropy decoding unit 202, an inverse quantization unit 203, the inverse transform unit 11, a motion compensation unit 204, an in-frame/inter-frame prediction unit 205, and a deblocking filter 206. The moving picture decoding device 200 may be, for example, formed as a single LSI or as a part of the single LSI. The embodiment disclosed above is applied to the inverse transform unit 11. Except for the inverse transform unit 11, known structural elements may be applicable to detailed structures, functions or the like of the other parts.

As further shown in FIG. 14, a standard signal corresponding to an image compression standard of an input stream is inputted to the overall control unit 201. The overall control unit 201 outputs a standard switching signal and a mode switching signal based on the standard signal. These standard switching signals and the mode switching signals are inputted to the inverse transform unit 11 as the standard/mode switching signals. Therefore, the overall control unit 201 is provided with a function as a signal generation unit. The standard switching signal and the mode switching signal may be different signals or may be a single signal as a standard/mode switching signal. Image data decoded by the moving picture decoding device 200 is stored in an external memory 210 that forms frame-buffers and then outputted to a display device (not shown).

Figure 15:
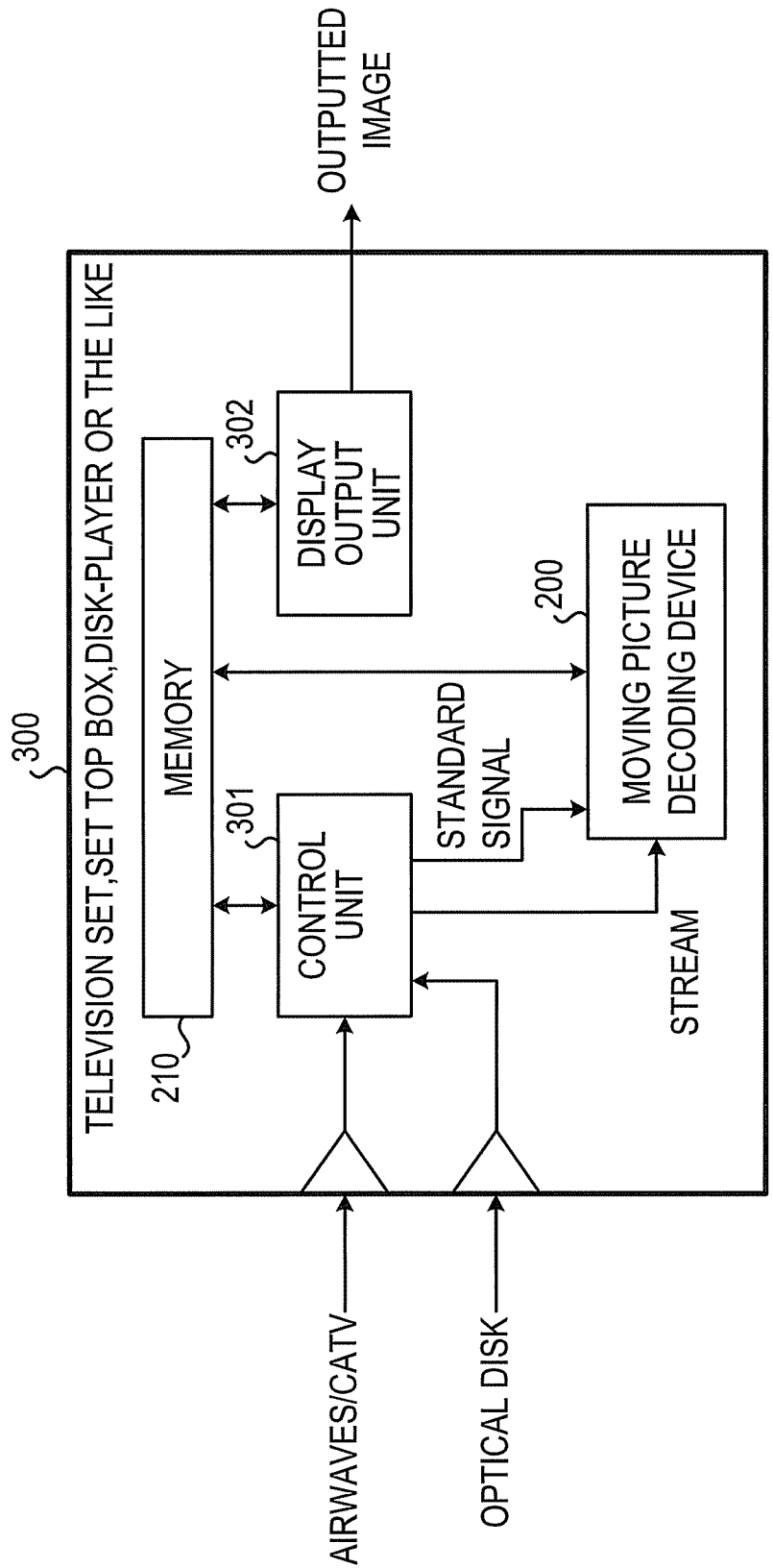
FIG. 15 illustrates one example of a moving picture reproduction apparatus that includes the inverse transform unit in FIG. 1.

FIG. 15 illustrates one example of a moving picture reproduction apparatus that includes the inverse transform unit in FIG. 1. The example shown in FIG. 15 is an example where the inverse transform unit according to the embodiment is applied to moving picture reproduction apparatuses, such as, a television set, a tuner, a set top box, and a disk player.

As shown in FIG. 15, a moving picture reproduction apparatus 300 includes a moving picture decoding device 200, an external memory 210, a control unit 301, and a display output unit 302. For example, the inverse transform unit in FIG. 1 according to the embodiment is included in the moving picture decoding device 200. The control unit 301 determines the image compression standard of an input signal based upon of airwaves or specifications of optical disks and supplies the moving picture decoding device 200 with the standard signal based on the image compression standard.

Figure 16:
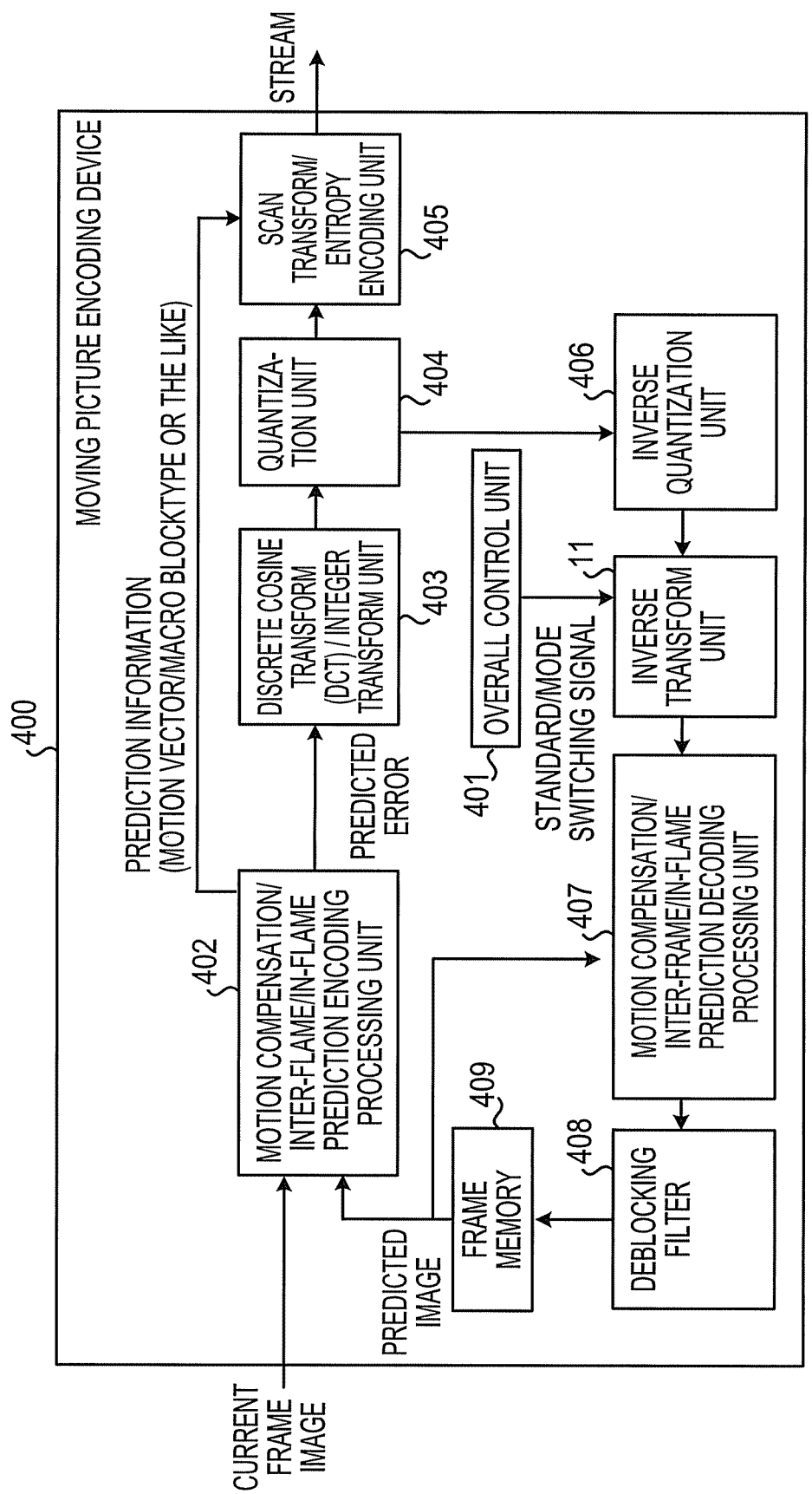
FIG. 16 illustrates another example of the semiconductor device that includes the inverse transform unit in FIG. 1.

FIG. 16 illustrates another example of the semiconductor device that includes the inverse transform unit in FIG. 1. The example in FIG. 16 is one example where the inverse transform unit according to the embodiment is applied to a moving picture encoding device based on a plurality of image compression standards.

As shown in FIG. 16, a moving picture encoding device 400 includes an overall control unit 401, a motion compensation/inter-frame/in-frame prediction encoding processing unit 402, a discrete cosine transform (DCT)/integer transform unit 403, a quantization unit 404, a scan transform/entropy encoding unit 405, an inverse quantization unit 406, the inverse transform unit 11, an motion compensation/inter-frame/in-frame prediction decoding processing unit 407, a deblocking filter 408, and a frame memory 409. The moving picture encoding device 400 may be, for example, formed as a single LSI or a part of the single LSI. The embodiment disclosed above may be applicable to the inverse transform unit 11. Except for the inverse transform unit 11, known structural elements may be applicable to detailed structures, functions or the like of the other parts.

As further shown in FIG. 16, the overall control unit 401 supplies the inverse transform unit 11 with a standard/mode switching signal, based on the moving picture compression standard. Consequently, the overall control unit 401 is provided with a function as a signal generation unit. The moving picture encoding device 400 decodes an encoded image data by the inverse quantization unit 406, the inverse transform unit 11, the motion compensation/inter-frame/in-frame prediction decoding processing unit 407, and the deblocking filter 408 and generates a predicted image. For this reason, the moving picture encoding device 400 includes the inverse conversion unit 11 according to the embodiment.

As disclosed above, according to the embodiment, since the inverse transform process of the signals, depending on the plurality of image compression standards, is performed by a single circuit, the inverse transform unit with reduced size in comparison with providing dedicated circuits performing the inverse transform processes with respect to each image compression standard may be achieved. Moreover, if the inverse transform process is performed as a software process by a central processing unit (CPU) or a digital signal processor (DSP), an amount of power consumption increases due to a high frequency and a huge number of circuits. However, in comparison with the software process disclosed above, reduced power consumption may be achieved by the present embodiment because a hardware process is employed in the present embodiment. Therefore, smaller circuit scale and reduced power consumption relative to a performance may be achieved.

According to the present embodiment, the signals depending on the plurality of image compression standards may be processed by a small-scaled circuit configuration.

The many features and advantages of the embodiment(s) are apparent from the detailed specification and, thus, it is intended by the appended claims to cover all such features and advantages of the embodiment(s) that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Numbers applying to embodiments (first, second or third etc.) do not show priorities of the embodiment(s). Many variations and modifications will be apparent to those skilled in the art.

What is claimed is:

1. A semiconductor device comprising:
   a first processing unit configured to process an input signal based on a plurality of image compression standards;
   a signal generation unit configured to output a switching signal, which sets a calculation based on the plurality of image compression standards, to the first processing unit;
   a first calculation unit configured to perform an operation on the input signal in accordance with a first coefficient that is based on the switching signal;
   a second calculation unit configured to perform an operation on an output of the first calculation unit in accordance with a second coefficient that is based on the switching signal;
   a selection unit configured to select one of the output of the first calculation unit and an output of the second calculation unit based on the switching signal; and
   a third calculation unit configured to select one or both of the input signal and the output of the first calculation unit based on the switching signal and to perform a predetermined calculation on the selected signal based on the switching signal;
   wherein the first calculation unit includes one or more variable coefficient multipliers,
   wherein the second calculation unit includes one or more fixed coefficient multipliers, and
   wherein the third calculation unit includes one or more addition/subtraction-shifters.

2. The semiconductor device according to claim 1,
   wherein the first calculation unit comprises a first variable coefficient multiplier configured to multiply the input signal by a first variable coefficient and a second variable coefficient multiplier configured to multiply the input signal by a second variable coefficient,
   wherein the second calculation unit comprises a first fixed coefficient multiplier configured to multiply an output of the first variable coefficient multiplier by a first fixed coefficient and a second fixed coefficient multiplier configured to multiply an output of the second variable coefficient multiplier by a second fixed coefficient,
   wherein the selection unit comprises a first selector configured to select one of the output of the first variable coefficient multiplier and an output of the first fixed coefficient multiplier, and a second selector configured to select one of the output of the second variable coefficient multiplier and an output of the second fixed coefficient multiplier, and
   wherein the third calculation unit comprises a first addition/subtraction-shifter unit configured to select one of performing one of an addition/subtraction and a bit shift and performing both of the addition/subtraction and the bit shift on an output of the input signal, the output of the first variable coefficient multiplier, and the output of the second variable coefficient multiplier, and a second addition/subtraction-shifter unit configured to select one of performing one of an addition/subtraction and a bit shift and performing both of the addition/subtraction and the bit shift on the output of the input signal, the output of the first variable coefficient multiplier, and the output of the second variable coefficient multiplier.

3. The semiconductor device according to claim 2,
   wherein, when the input signal depends on an MPEG standard, $\sin(\pi/16)$ is set as the first variable coefficient for the first variable coefficient multiplier, $\cos(\pi/16)$ is set as the second variable coefficient for the second variable coefficient multiplier, $2\sqrt{2}$ is set as the first fixed coefficient for the first fixed coefficient multiplier, and $2\sqrt{2}$ is set as the second fixed coefficient for the second fixed coefficient multiplier, and wherein the first selector selects the output of the first fixed coefficient multiplier, the second selector selects the output of the second fixed coefficient multiplier, the first addition/subtraction-shifter unit adds the output of the first variable coefficient multiplier to the output of the second variable coefficient multiplier and shifts a result of the addition by 1 bit in a lower bit direction, and the second addition/subtraction-shifter unit subtracts the output of the first variable coefficient multiplier from the output of the second variable coefficient multiplier and shifts a result of the subtraction by 1 bit in the lower bit direction, so that the input signal is multiplied by $2\sqrt{2} \sin(\pi/16)$, $2\sqrt{2} \cos(\pi/16)$, $2\sqrt{2} \cos(3\pi/16)$, and $2\sqrt{2} \sin(3\pi/16)$.

4. The semiconductor device according to claim 2, wherein, when the input signal depends on a VC-1 standard, 15 is set as the first variable coefficient for the first variable coefficient multiplier and 9 is set as the second variable coefficient for the second variable coefficient multiplier, and wherein the first selector selects the output of the first variable coefficient multiplier, the second selector selects the output of the second variable coefficient multiplier, the first addition/subtraction-shifter unit shifts the output of the input signal by 4 bits in an upper bit direction, and the second addition/subtraction-shifter unit shifts the output of the input signal by 2bits in the upper bit direction, so that the input signal is multiplied by 15, 9, 16, and 4.

5. The semiconductor device according to claim 2, wherein, when the input signal depends on an AVS standard, 9 is set as the first variable coefficient for the first variable coefficient multiplier and 6 is set as the second variable coefficient for the second variable coefficient multiplier, and wherein the first selector selects the output of the first variable coefficient multiplier, the second selector selects the output of the second variable coefficient multiplier, the first addition/subtraction-shifter unit adds the output of the first variable coefficient multiplier to the output of the input signal, and the second addition/subtraction-shifter unit shifts the output of the input signal by 1 bit in an upper bit direction, so that the input signal is multiplied by 9, 6, 10, and 2.

6. The semiconductor device according to claim 2, wherein, when the input signal depends on an H.264 standard, 1 is set as the first variable coefficient for the first variable coefficient multiplier and 0.5 is set as the second variable coefficient for the second variable coefficient multiplier, and wherein the first selector selects the output of the first variable coefficient multiplier, the second selector selects the output of the second variable coefficient multiplier, and the first addition/subtraction-shifter unit adds the output of the second variable coefficient multiplier to the output of the input signal, so that the input signal is multiplied by 1, 0.5, and 1.5.

7. The semiconductor device according to claim 2, further comprising:
a second processing unit configured to cumulatively add an output of the first processing unit,
wherein the second processing unit comprises an adder/subtractor configured to repeat one of an addition and a subtraction of the output of the first processing unit, based on the switching signal, and a first error detection unit configured to perform error detection on an output of the adder/subtractor, based on the switching signal.

8. The semiconductor device according to claim 7, wherein, when the input signal depends on an H.264 standard, the first error detection unit detects an overflow in the output of the adder/subtractor.

9. The semiconductor device according to claim 7 further comprising:
a third processing unit configured to perform a butterfly calculation on an output of the second processing unit,
wherein the third processing unit comprises a third addition/subtraction-shifter unit configured to select one of performing one of an addition/subtraction and a bit shift and performing both of the addition/subtraction and the bit shift on the output of the second processing unit, based on the switching signal, and a second error detection unit configured to perform error detection on an output of the third addition/subtraction-shifter unit, based on the switching signal.

10. The semiconductor device according to claim 9, wherein, when the input signal depends on an MPEG standard, the third addition/subtraction-shifter unit adds 2 to a result of the butterfly calculation and shifts a result of the addition by 2 bits in a lower bit direction, so that a round-off process is performed.

11. The semiconductor device according to claim 9, wherein, when the input signal depends on a VC-1 standard, the third addition/subtraction-shifter unit adds 4 to a result of the butterfly calculation and shifts a result of the addition by 3 bits in a lower bit direction, so that a round-off process is performed, and
wherein the second error detection unit detects an overflow in a result of the round-off process.

12. The semiconductor device according to claim 9, wherein, when the input signal depends on a VC-1 standard, the third addition/subtraction-shifter unit adds one of 64 and 65 to a result of the butterfly calculation and shifts a result of the addition by 7 bits in a lower bit direction, so that a round-off process is performed, and
wherein the second error detection unit detects an overflow in a result of the round-off process.

13. The semiconductor device according to claim 9, wherein, when the input signal depends on an AVS standard, the third addition/subtraction-shifter unit adds 4 to a result of the butterfly calculation and shifts a result of the addition by 3 bits in a lower bit direction, so that a round-off process is performed.

14. The semiconductor device according to claim 9, wherein, when the input signal depends on an AVS standard, the third addition/subtraction-shifter unit adds 64 to a result of the butterfly calculation and shifts a result of the addition by 7 bits in a lower bit direction, so that a round-off process is performed.

15. The semiconductor device according to claim 9, wherein, when the input signal depends on an H.264 standard, the third addition/subtraction-shifter unit performs an intermediate calculation, prior to the butterfly calculation performed by the third processing unit, on the output of the second processing unit and performs the butterfly calculation on a result of the intermediate calculation, and
wherein the second error detection unit detects an overflow in the result of the intermediate calculation and a result of the butterfly calculation.

16. The semiconductor device according to claim 9 further comprising:
a fourth processing unit configured to input the input signal and output an output of the third processing unit once in every cycle;

wherein, when the input signal depends on one of an MPEG standard, a VC-1 standard, and an AVS standard, the fourth processing unit outputs the output of the third processing unit, based on the switching signal, and when the input signal depends on an H.264 standard, the fourth processing unit shifts the output of the third processing unit by 5 bits in a lower bit direction, adds 1 to the output of the third processing unit, and shifts the output of the third processing unit by 1 bit in the lower bit direction, based on the switching signal, so that a round-off process is performed and the output of the third processing unit after the round-off process is outputted.

17. The semiconductor device according to claim 9 further comprising:

a horizontal processing unit configured to perform a one-dimensional horizontal calculation process, the horizontal processing unit including the first processing unit, the second processing unit, and the third processing unit;

a vertical processing unit configured to perform a one-dimensional vertical calculation process, the vertical processing unit including the first processing unit, the second processing unit, and the third processing unit; and a transposition RAM configured to rearrange an output of the horizontal processing unit and to transfer the rearranged output to the vertical processing unit.

18. A method of processing a signal comprising:

performing a first calculation, using one or more variable coefficient multipliers, on an input signal that is based on a plurality of image compression standards in accordance with a first coefficient that is based on a switching signal that sets a calculation based on the plurality of image compression standards;

performing a second calculation, using one or more fixed coefficient multipliers, on an output of the first calculation in accordance with a second coefficient that is based on the switching signal;

selecting one of the output of the first calculation and an output of the second calculation, based on the switching signal; and selecting one or both of the input signal and the output of the first calculation based on the switching signal and performing a predetermined third calculation, using one or more addition/subtraction-shifters, on one the selected signal based on the switching signal.

* * * * *